(12) United States Patent
Gabrielson

(10) Patent No.: US 11,569,997 B1
(45) Date of Patent: Jan. 31, 2023

(54) SECURITY MECHANISMS FOR DATA PLANE EXTENSIONS OF PROVIDER NETWORK SERVICES

(71) Applicant: Amazon Technologies, Inc., Seattle, WA (US)

(72) Inventor: Jacob Adam Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 16/812,891

(22) Filed: Mar. 9, 2020

(51) Int. Cl.
| | |
|---|---|
| H04L 9/00 | (2022.01) |
| H04L 29/06 | (2006.01) |
| H04L 12/24 | (2006.01) |
| H04L 9/32 | (2006.01) |
| H04L 12/46 | (2006.01) |
| H04L 9/40 | (2022.01) |
| H04L 47/70 | (2022.01) |
| H04L 41/0893 | (2022.01) |
| H04L 61/5007 | (2022.01) |

(52) U.S. Cl.
CPC .......... *H04L 9/3213* (2013.01); *H04L 9/3234* (2013.01); *H04L 12/4641* (2013.01); *H04L 41/0893* (2013.01); *H04L 47/70* (2013.01); *H04L 61/5007* (2022.05); *H04L 63/0272* (2013.01)

(58) Field of Classification Search
CPC . H04L 9/3213; H04L 9/3234; H04L 12/4641; H04L 41/0893; H04L 47/70; H04L 61/2007; H04L 63/0272; H04L 61/5007
See application file for complete search history.

(56) References Cited

U.S. PATENT DOCUMENTS

| | | |
|---|---|---|
| 6,741,585 B1 | 5/2004 | Munoz et al. |
| 7,484,091 B2 | 1/2009 | Bade et al. |
| 7,620,731 B1 | 11/2009 | Dasan |
| 7,814,255 B1 | 10/2010 | Deva |

(Continued)

FOREIGN PATENT DOCUMENTS

| | | |
|---|---|---|
| CN | 105027108 A | 11/2015 |
| CN | 105308931 A | 2/2016 |

(Continued)

OTHER PUBLICATIONS

U.S. Appl. No. 14/860,494, filed Sep. 21, 2015, Kevin Christopher Miller.

(Continued)

*Primary Examiner* — Christopher B Robinson
(74) *Attorney, Agent, or Firm* — Robert C. Kowert; Kowert, Hood, Munyon, Rankin & Goetzel, P.C.

(57) ABSTRACT

A connectivity enablement device includes one or more processors, one or more memories and a hardware input port. The memories store program instructions that when executed examine a token obtained from a token transfer device inserted into the port, and cause one or more messages to be transmitted to a virtualized computing service. The messages indicate (a) the connectivity enablement device, (b) the token transfer device, (c) the token's source and (d) a server. An indication that the server has been configured within an isolated virtual network is obtained at the connectivity enablement device.

20 Claims, 10 Drawing Sheets

(56) References Cited

U.S. PATENT DOCUMENTS

| | | |
|---|---|---|
| 7,996,836 B1 | 8/2011 | McCorkendale et al. |
| 8,032,899 B2 | 10/2011 | Archer et al. |
| 8,127,292 B1 | 2/2012 | Dobrovolskiy et al. |
| 8,201,161 B2 | 6/2012 | Challener et al. |
| 8,239,557 B2 | 8/2012 | McCune et al. |
| 8,396,946 B1 | 3/2013 | Brandwine et al. |
| 8,433,802 B2 | 4/2013 | Head et al. |
| 8,514,868 B2 | 8/2013 | Hill |
| 8,589,918 B1 | 11/2013 | Sapuntzakis |
| 8,612,968 B2 | 12/2013 | DeHaan |
| 8,745,755 B2 | 6/2014 | Borzycki et al. |
| 9,042,384 B2 | 5/2015 | Sridharan et al. |
| 9,137,205 B2 | 9/2015 | Rogers et al. |
| 9,203,748 B2 | 12/2015 | Jiang et al. |
| 9,270,703 B1 * | 2/2016 | Clough ............... H04L 63/107 |
| 9,323,552 B1 | 4/2016 | Adogla et al. |
| 9,361,145 B1 | 6/2016 | Wilson et al. |
| 9,407,599 B2 | 8/2016 | Koponen et al. |
| 9,485,323 B1 | 11/2016 | Stickle et al. |
| 9,860,168 B1 | 1/2018 | Seshadri |
| 9,954,763 B1 | 4/2018 | Ye et al. |
| 9,979,694 B2 | 5/2018 | Brandwine et al. |
| 10,057,267 B1 | 8/2018 | Miller et al. |
| 10,095,537 B1 | 10/2018 | Neogy et al. |
| 10,348,767 B1 | 7/2019 | Lee et al. |
| 10,498,611 B1 | 12/2019 | Kloberdans et al. |
| 10,812,366 B1 | 10/2020 | Berenberg et al. |
| 2003/0070027 A1 | 4/2003 | Ng |
| 2004/0177132 A1 | 9/2004 | Zhang et al. |
| 2005/0013280 A1 | 1/2005 | Buddhikot et al. |
| 2005/0224307 A1 | 10/2005 | Steffen |
| 2005/0251806 A1 | 11/2005 | Auslander et al. |
| 2006/0206658 A1 | 9/2006 | Hendel et al. |
| 2008/0244553 A1 | 10/2008 | Cromer et al. |
| 2009/0327576 A1 | 12/2009 | Oshins |
| 2010/0070970 A1 | 3/2010 | Hu et al. |
| 2010/0106822 A1 | 4/2010 | Nagai et al. |
| 2010/0205375 A1 | 8/2010 | Challener et al. |
| 2011/0075667 A1 | 3/2011 | Li et al. |
| 2011/0131443 A1 | 6/2011 | Laor et al. |
| 2011/0255423 A1 | 10/2011 | Gustin |
| 2011/0314469 A1 | 12/2011 | Qian |
| 2012/0054832 A1 | 3/2012 | Ghosh |
| 2012/0110650 A1 | 5/2012 | Van Biljon et al. |
| 2012/0124129 A1 | 5/2012 | Klimentiev et al. |
| 2012/0179802 A1 | 7/2012 | Narasimhan et al. |
| 2013/0287026 A1 | 10/2013 | Davie |
| 2013/0291087 A1 | 10/2013 | Kailash et al. |
| 2013/0305341 A1 | 11/2013 | Baker et al. |
| 2013/0315243 A1 | 11/2013 | Huang et al. |
| 2014/0108665 A1 | 4/2014 | Arora et al. |
| 2014/0208413 A1 | 7/2014 | Grobman et al. |
| 2015/0160884 A1 | 6/2015 | Scales et al. |
| 2015/0172169 A1 | 6/2015 | DeCusatis et al. |
| 2015/0195137 A1 | 7/2015 | Kashyap et al. |
| 2015/0271027 A1 | 9/2015 | Goldberg |
| 2015/0356031 A1 | 12/2015 | Gintis |
| 2015/0381484 A1 | 12/2015 | Hira |
| 2015/0381773 A1 | 12/2015 | Visser |
| 2016/0026573 A1 | 1/2016 | Jacobs et al. |
| 2016/0072816 A1 | 3/2016 | Makhervaks |
| 2016/0072910 A1 | 3/2016 | Eicher et al. |
| 2016/0077845 A1 | 3/2016 | Earl et al. |
| 2016/0134616 A1 * | 5/2016 | Koushik ............... G06F 21/335 726/9 |
| 2016/0170781 A1 | 6/2016 | Liguori et al. |
| 2016/0170785 A1 | 6/2016 | Liguori |
| 2016/0315879 A1 | 10/2016 | Morris |
| 2017/0123935 A1 | 5/2017 | Pandit |
| 2017/0286486 A1 | 10/2017 | Pang |
| 2017/0300354 A1 | 10/2017 | Dalal et al. |
| 2017/0322899 A1 | 11/2017 | Ni |
| 2017/0366606 A1 | 12/2017 | Ben-Shaul et al. |
| 2017/0371546 A1 | 12/2017 | Rivera |
| 2018/0004954 A1 | 1/2018 | Liguori |
| 2018/0024964 A1 | 1/2018 | Mao |
| 2018/0032360 A1 | 2/2018 | Agarwal et al. |
| 2018/0139174 A1 | 5/2018 | Thakkar et al. |
| 2018/0196947 A1 | 7/2018 | Davis et al. |
| 2018/0260125 A1 | 9/2018 | Botes et al. |
| 2019/0188763 A1 | 6/2019 | Ye et al. |
| 2020/0057664 A1 | 2/2020 | Durham et al. |
| 2020/0092138 A1 | 3/2020 | Tillotson et al. |
| 2020/0142842 A1 | 5/2020 | Ryu |
| 2020/0159555 A1 | 5/2020 | Liguori et al. |
| 2021/0037105 A1 | 2/2021 | Smith-Denny |
| 2021/0092182 A1 | 3/2021 | Liguori et al. |
| 2021/0337016 A1 | 10/2021 | Liguori et al. |

FOREIGN PATENT DOCUMENTS

| | | |
|---|---|---|
| CN | 108431778 A | 8/2018 |
| EP | 1701259 | 9/2006 |
| EP | 2557498 | 2/2013 |
| JP | 2016536721 | 11/2016 |
| KR | 20040001211 | 1/2004 |
| KR | 20120049929 | 5/2012 |
| WO | 2011041162 | 4/2011 |
| WO | 2015042559 | 3/2015 |

OTHER PUBLICATIONS

Amazon AWS, Example: Cisco ASA Device, Retrieved from http://docs.aws.amazon.com/ AmazonVPC/latest/NetworkAdminGuide/Cisco_ASA(WaybackMachine); Feb. 2013, pp. 1-5.

Zsgur Ulusoy, "Processing Real-Time Transactions in a Replicated Database System," 1994 Kluwer Academic Publishers, Boston, Revised Sep. 10, 1993, pp. 1-32.

Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994-2/13/04, pp. 85-98.

Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.

Robbert van Renesse, et al, "Chain Replication for Supporting High Throughput and Availability," USENIX Association, OSDI 2004: 6th Symposium on Operating Systems Design and Implementation, pp. 91-104.

Philip A. Bernstein, et a., "Concurrency Control and Recovery in Database Systems," Addison-Wesley Publication Company, ISBN 0-201-10715-5, 1987, pp. 1-58.

From Wikipedia, the free encyclopedia, "Bromium," downloaded on Jun. 27, 2016 from https://en.wikipedia.org/wiki/Bromium, pp. 1-4.

Xen, "Dom0" downloaded Jun. 6, 2016 from http://wiki.xen.org/wiki/Dom0, last updated Mar. 29, 2015, pp. 1-2.

Amazon Web Services, "Amazon Elastic Compute Cloud: User Guide for Linux Instances," Latest Version update 2015, pp. 1-816.

IBM, General Information, Version 4, Release 3.0, Fifth Edition, Apr. 2002, pp. 1-101.

From Wikipedia, the free encyclopedia, "Hypervisor," downloaded Jun. 6, 2016 from https://en.wikipedia.org/wiki/Hypervisor, pp. 1-7.

Axel Buecker, et al., "Reduce Risk and Improve Security on IBM Mainframes: vol. 1 Architecture and Platform Security," Redbooks, IBM, Dec. 2014, pp. 1-308.

From Wikipedia, the free encyclopedia, "VMware ESX," downloaded Jun. 6, 2016 from https://en.wikipedia.org/wiki/VMware_ESX, pp. 1-13.

From Wikipedia, the free encyclopedia, "Xen," downloaded from Jun. 6, 2016 from https://en.wikipedia.org/wiki/Xen, pp. 1-12.

Udo Steinberg, et al., "NOVA: A Microhypervisor-Based Secure Virtualization Architecture", ACM, EuroSys'10, Apr. 13-16, 2010, pp. 209-222.

Sangster, et al., TCG Published, Virtualized Trusted Platform Architecture Specification, Specification Version 1.0, Revision 0.26, Sep. 27, 2011, pp. 1-60.

(56) References Cited

OTHER PUBLICATIONS

Network Functions Virtualisation (NFV); NFV Security; Security and Trust Guidance, ETSI GS NFV-SEC 003, V1.1.2, downloaded by EP on Jun. 4, 2016, pp. 1-57.
Cong Xu, et al., "vSlicer: Latency-Aware Virtual Machine Scheduling via Differentiated-Frequency CPU Slicing", Purdue University, Purdue e-Pubs, 2012, pp. 1-14.
Amazon Web Services, "Amazon Elastic Compute Cloud: User Guide for Linux Instances," Latest Version update 2018, pp. 1-884.
Xmazon Web Services, "Amazon Elastic Container Service: Developer Guide" API Version, Nov. 13, 2014, pp. 1-386.
Amazon Web Services, "AWS Lambda: Developer Guide" 2018, pp. 1-539.
AWS, "Annoucing Amazon EC2 Bare Metal Instances (Preview)", Retrieved from URL: https://aws.amazon.com/about-aws/whats-new/2017/11/announcing-amazon-ec2-bare-metal-instances-preview/ on Jan. 15, 2018, pp. 1-4.
Brendan Gregg's Blog, "AWS EC@ Virtualization 2017: Introducing Nitro", Retrieved from URL: http://www.brendangregg.com/blog/2017-11-29/aws-ec2-virtualization-2017.html, pp. 1-11.
U.S. Appl. No. 16/196,723, filed Nov. 20, 2018, Anthony Nicholas Liguori.
U.S. Appl. No. 16/196,736, filed Nov. 20, 2018, Anthony Nicholas Liguori.
U.S. Appl. No. 16/581,619, filed Sep. 24, 2019, Liguori, et al.
U.S. Appl. No. 16/581,646, filed Sep. 24, 2019, Anthony Nicholas Liguori.
U.S. Appl. No. 15/173,445, filed Jun. 3, 2016, Wilson, et al.
U.S. Appl. No. 14/869,907, filed Sep. 29, 2015, David Sean Russell.
U.S. Appl. No. 14/864,682, filed Sep. 24, 2015, Danilov, et al.
U.S. Appl. No. 14/535,056, filed Nov. 6, 2014, Potlapally, et al.
U.S. Appl. No. 15/199,489, filed Jun. 30, 2016, Liguori, et al.
U.S. Appl. No. 15/199,479, filed Jun. 30, 2016, Liguori, et al.
U.S. Appl. No. 15/236,116, filed Aug. 12, 2016, Konrad Jan Miller et al.
U.S. Appl. No. 15/374,520, filed Dec. 9, 2016, Akhilesh Mritunjai.
U.S. Appl. No. 16/017,886, filed Jun. 25, 2018, Upendra Bhalchandra Shevade et al.
U.S. Appl. No. 15/905,681, filed Feb. 26, 2018, Uphendra Bhalchandra Shevade, et al.

\* cited by examiner

US 11,569,997 B1

SECURITY MECHANISMS FOR DATA PLANE EXTENSIONS OF PROVIDER NETWORK SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more compute instances (such as "guest" virtual machines) hosted by the single virtualization host. Each such compute instance may represent a software simulation acting as a distinct logical computing system that provides users with the illusion that they are the sole operators of a given hardware computing resource, while also providing application isolation and security among the various virtual machines. Instantiating several different compute instances on the same host may also help increase the overall hardware utilization levels at a data center, leading to higher returns on investment.

A wide variety of resources, including compute instances suitable for different types of applications such as compute-intensive applications, memory-intensive applications, and the like may be set up at the data centers of some cloud computing provider networks in response to client requests. Such resources, used for client applications, may be referred to as data plane resources. In contrast, administrative tasks such as responding to configuration requests pertaining to data plane resources, provisioning data plane resources, monitoring the availability of data plane resources, and so on may be handled by a different set of provider network resources, referred to as control-plane resources.

Figure 1:
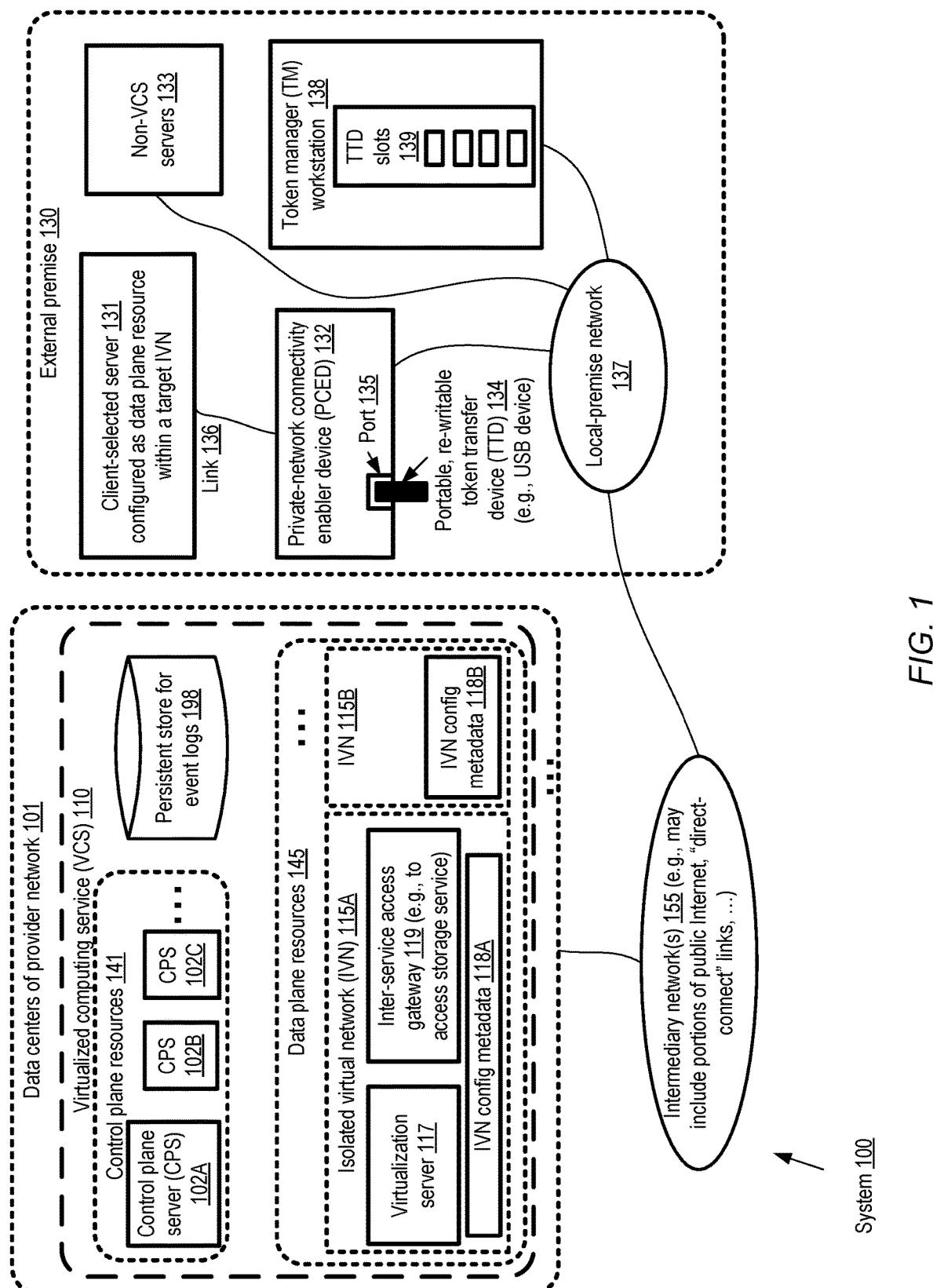
FIG. 1 illustrates an example system environment in which servers located at a premise external to a provider network's data centers may be configured, using a physical token-based multi-step security technique, within isolated virtual networks managed by control plane resources of the provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for securely configuring client-selected resources, which are located at premises external to the data centers of a provider network (also referred to as a cloud computing environment or cloud provider network), within the data plane of a service implemented at the provider network, such that the resources can be managed using administrative or control plane programmatic interfaces of the service. For example, using a multi-step security workflow which involves the use of a portable hardware device with a dynamically generated token, and requires the physical presence and participation of an authorized administrator at the external premise, a hardware server at the external premise may be configured as a resource within the data plane of a virtualized computing service (VCS). Furthermore, in some cases, the continued presence of an authenticated (and periodically re-authenticated, if desired) portable hardware device containing the token (at a device attached to the server) may be required in order for a server to continue to be managed as part of the data plane. An administrator of the computing infrastructure of the external premise may be able to securely incorporate one or more servers within respective private or isolated networks of the VCS using the described techniques, and have access to comprehensive auditable log records indicating all the operations performed as part of the security workflows. After the servers have been added to the VCS, further configuration of the servers (e.g., including establishing connectivity via provider network pathways to storage services or database services of the provider network, instantiating compute instances at the server if desired, and so on) may be managed using standardized VCS programmatic interfaces, thus reducing the administrative burden associated with the servers.

The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include a number of network-accessible services, such as a VCS, one or more storage services, database services and the like. A VCS may also be referred to as an elastic compute service, virtual machines service, computing cloud service, compute engine, and/or cloud compute in various implementations.

The traffic and operations of the provider network may broadly be subdivided into two categories in various embodiments: control plane operations carried over a logical control plane, and data plane operations carried over a logical data plane. While the data plane represents the movement of user data through the distributed computing system of the provider network, the control plane represents the movement of control signals through the distributed computing system. The control plane generally includes one or more control plane components distributed across and implemented by one or more control servers or resources. Control plane traffic generally includes administrative operations, such as system configuration and management (e.g., resource placement, hardware capacity management, diagnostic monitoring, system state information and the like). The data plane includes resources that are implemented on behalf of customers or clients on the cloud provider network (e.g., computing instances, containers, block storage volumes, databases, file storage, and so on). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks in at least some implementations.

As indicated above, a multi-step security workflow may be employed in various embodiments to enable a hardware server at the external premise of a client of the provider network to be configured as a resource within the data plane of a virtualized computing service (VCS). As part of the configuration of the server as a data plane resource, metadata about the server may be stored at the VCS, and the server may be assigned one or more network addresses of a private or isolated network set up on behalf of the client in some embodiments. Such a server may then be used to (if desired) host compute instances (e.g., virtual machines or bare-metal instances) and/or software containers managed using control plane interfaces, interact with other services of the provider network over private networking paths managed with the help of the VCS, interact with virtualized computing resources of the client using encapsulation protocols of the VCS, and so on.

Configuring a server located outside the data centers of the provider network as a data plane resource of a service such as the VCS may be referred to as "extending the data plane" of the service, and the set of such servers at a given external premise may be referred to as a "data plane extension" herein. Note that in some cases, not all the servers located at a given external premise may necessarily be incorporated within the VCS data plane; some servers at the premise may for examine remain configured within a local network of the external premise, and connectivity between such local network servers and the data plane extension severs may also be managed with the help of some of the hardware devices used for the data plane extension servers as described below. After a server is incorporated as a data plane resource of the VCS, programmatic interfaces supported by the VCS control plane may be employed to change configuration settings of such a server, check the liveness or health of the server, and so on, just as such interfaces may be used to perform the same kinds of operations with respect to VCS data plane servers located within data centers of the provider network. The VCS control plane itself may not be extended in various embodiments, in the sense that control plane servers, metadata etc., may remain within the data centers of the provider network, and requests submitted via the programmatic interfaces of the VCS control plane may be received and processed at the data centers of the provider network. It is noted that although a VCS is used as the primary example of a service whose data plane is securely extended using the techniques described herein, such techniques may be applied with equal success to extend data planes of other network-accessible services of provider networks (such as storage services, database services, and the like) in various embodiments.

It may be helpful, before describing the security techniques for VCS data plane extensions in more detail, to introduce the concept of isolated virtual networks (IVNs).

An IVN of the provider network portion of a VCS may comprise a collection of networked resources (including, for example, compute instances) assigned or allocated to a given client, which are logically isolated from (and by default, inaccessible from) resources allocated for other clients in other IVNs. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Furthermore, in at least some embodiments, custom network endpoints may be set up within IVNs to enable compute instances of the IVN to communicate with network-accessible services of the provider network (such as storage services, database services, machine learning services, etc.) using private network pathways of the provider network, without having to traverse or use links or devices of the public Internet. In various embodiments, the network addresses assigned to compute instances within an IVN may differ from the underlying or "substrate" network addresses assigned to the hardware servers on which the compute instances run. An encapsulation protocol and associated mapping service may be used to route the flows of network traffic within and across the IVNs (e.g., from one compute instance to another, between client devices external to the VCS and the compute instances, or between compute instances and other provider network services) over the links and servers of the underlying substrate network in various embodiments.

With the help of the security techniques described herein, servers located at premises outside of the provider network may be incorporated within IVNs in various embodiments—that is, IVNs may in effect be extended to premises outside the data centers of the provider network of which the VCS is a part. The data plane resources (e.g., virtualization hosts, service endpoints, compute instances run on the servers, etc.) of some IVNs may include devices located both within the provider network data centers and at external premises; other IVNs may include data plane resources only within the data centers, or only within one or more external premises in at least some embodiments.

According to at least some embodiments, security protocols for extending the VCS data plane may be implemented with the help of at least four types of resources used in combination: (a) token generation workstations (also referred to herein as token managers or TMs), (b) private-network connectivity enabler devices (PCEDs), (c) portable, re-writable token transfer devices (TTDs) and (d) control plane resources of the VCS. The first three types of resources may be located in the external premises to which the data plane is to be extended, while the control plane of the VCS may comprise computing devices located at the provider network data centers. In some embodiments, the respective hardware devices (with pre-installed software in some cases) used for TMs, PCEDs and/or TTDs may be ordered by a VCS client who wishes to add servers at an external premise to the VCS data plane. If the client wishes to add N servers to the VCS data plane (and the servers are to be used concurrently as VCS data plane resources), in some embodiments at least 1 TM, N PCEDs and N TTDs may be required. In other embodiments, it may be possible to re-use the same PCED (or even the same TTD) for multiple servers.

At a high level, the roles of the four types of resources in at least some embodiments may be summarized as follows. The TM may be responsible for dynamically generating security tokens which are required to be provided to a PCED to allow a given server (for example, a server S1) of the client, which is connected via a local network link (e.g., an Ethernet cable, or a wi-fi link) to the PCED, to be incorporated within a given isolated virtual network (IVN) of the VCS. A given TTD may be used to physically transfer the dynamically generated token from the TM to a given PCED linked to S1—for example, a TTD may comprise a USB (Universal Serial Bus) device which is first inserted into a slot at the TM (to receive the token), then physically carried to the PCED by an administrator, and then inserted into a slot at the PCED which then obtains the token. The PCED may be responsible for obtaining and verifying the token, and communicating information about the token (including the TM at which the token was generated, as well as the TTD used for transferring the token) and the server S1 to the VCS control plane resources. The VCS control plane resources may be responsible for verifying the respective identities of the TM, the PCED, and the TTD prior to the generation of the token, validating the token (which may include re-authenticating the TM, the PCED and the TTD), and then storing configuration metadata indicating that S1 has been configured as part of the IVN. Additional details about the operations performed at each of the four types of participant resources are provided below. A given TM, a given PCED and/or a given TTD may each comprise one or more processors and a memory in various embodiments. In some embodiments a TTD may include memory (e.g., to store the token) but may not necessarily include a processor.

As one skilled in the art will appreciate in light of this disclosure, certain embodiments may be capable of achieving various advantages, including some or all of the following: (a) ensuring high levels of security for resources managed using a provider network, even in cases where the resources are located at premises outside the provider network, (b) reducing the administrative burden associated with managing servers and other resources located at premises external to a provider network, e.g., by simplifying the task of separating distinct sets of servers into respective private or isolated networks, and allowing administrators to use proven provider network control plane interfaces for configuration changes of the resources, and/or (c) enabling more complex and sophisticated applications be run at resources outside a provider network, by enabling easy access to a variety of provider network services which each provide specialized functionality (e.g., database functionality, machine learning functionality etc.) with extremely high levels of scalability, availability and reliability.

According to some embodiments, a system may comprise one or more computing devices. The computing devices may include instructions that upon execution on or across one or more processors cause the one or more computing devices to verify, by one or more control plane resources of a VCS of a provider network, an identity of a TM (token manager) located at a premise external to the provider network. The control plane resources may be located at one or more data centers of the provider network, and network connectivity may be established between the TM and the control plane resources (e.g., as part of a preliminary procedure to register the TM at the VCS, which also includes identity verification or authentication). The identity of the TM may be indicated at least in part by a message, signed using a unique private cryptographic key of the TM, which is received at the control plane resources from the TM in some embodiments—for example, the TM may decrypt the message using a public key of the TM and check that the contents of the message (such as a recent timestamp) are acceptable. In some implementations, the private key of the TM may be immutable—e.g., at least the private key may be embedded in hardware of the TM by the manufacturer of the TM. In one implementation, both the private key and a corresponding public key of a cryptographic key pair may be embedded in the TM hardware. In some embodiments, other authentication or security protocols (which may not necessarily involve the use of a signed message) may be used by the VCS control plane to verify that the TM is trusted.

In various embodiments, the VCS control plane resources may also verify the identity of a PCED (private-network connectivity enablement device) located at the same external premise as the TM, e.g., as part of a preliminary setup operation before the PCED is used to actually add a server to the VCS data plane. Network connectivity may also be established between the control plane and the PCED. The PCED and the TM may connect to the VCS independently of each other in at least some embodiments—different connections, and/or sessions may be used for PCED-to-VCS-control-plane communications than are used for TM-to-VCS-control-plane communications. In at least some embodiments, a message signed using a private key assigned specifically to the PCED (distinct from the private key of the TM) may be used to indicate the identity of the PCED, in a manner similar to the way the TM's identity was indicated by a signed message. In some implementations, the private key of the PCED may be immutable—e.g., at least the private key may be embedded in hardware of the PCED by the manufacturer of the PCED. In one implementation, both the private key and a corresponding public key of a cryptographic key pair may be embedded in the PCED hardware. In some embodiments, other authentication or security protocols (which may not necessarily involve the use of a signed message) may be used by the VCS control plane to verify that the PCED is trusted. The PCED may be linked to a server (e.g., via an Ethernet cable, some other physical cable, a wi-fi link, or the like) which is to be incorporated within an IVN while remaining located at the external premise.

The VCS control plane resources may identify, e.g., based on contents of one or more messages received via another network connection from an authorized administrator at the external premise, a target IVN of the VCS within which the server located at the external premise is to be configured as a data plane resource in some embodiments. After determining the identity of the target IVN, the VCS control plane may transmit a set of target-IVN-specific security artifacts to the TM in various embodiments. The TM may in turn utilize the IVN-specific security artifacts to generate a security token which is to be provided to the PCED in at least some embodiments. In some cases, the authorized administrator who selected the target IVN may physically carry a rewritable hardware TTD (token transfer device) containing the token from the TM (where the token was written onto the TTD) to the PCED. Alternatively, the authorized administrator may deputize some other person to carry the TTD to the PCED in some embodiments. The TTD may be inserted into a port at the PCED, and read by the PCED. In some embodiments, the PCED may verify the identity of the TTD, e.g., by using a public cryptographic key assigned to the TTD to decrypt a message signed using the TTD's private key, or using some alternative security protocol. In at least one embodiment, the PCED may also verify the validity of the security token itself—e.g., the token may have an associated timestamp indicating a time after which the token is no longer valid, and the PCED may verify that the token validity has not expired. The PCED may then generate one or more messages (which may include the token, or contents derived from the token, an indication that the TTD has been authenticated, and/or additional information about the server and the PCED itself) and send them to the VCS control plane.

At the VCS control plane, the messages transmitted from the PCED may be received and processed in various embodiments. Based on the processing, the VCS control plane resources may determine that (a) a security token, which was generated at the TM using an artifact associated with the target IVN, has been obtained at the PCED via a TTD inserted into a PCED port, and (b) that at least one network path exists between the server and the PCED. In some implementations, the processing may involve using respective public keys assigned to the TM, the PCED and/or the TTD at the VCS control plane to decrypt at least some contents of the messages, thus re-authenticating the TM, PCED and/or TTD. In at least one embodiment, an indication of the IVN-specific security artifacts (which were earlier sent by the VCS control plane and then used to generate the token) may also be obtained at the VCS control plane from the messages sent by the PCED, thus in effect completing the loop between the VCS control plane, the TM, and the PCED, and providing additional confirmation to the VCS control plane that the server can be safely added to the target IVN. The VCS control plane may then store metadata indicating that the server has been configured as a data plane resource of the target IVN in at least some embodiments. An indication that the server has been successfully added to the target IVN may be sent to the PCED in at least some embodiments from the VCS control plane. After the metadata has been stored, the server located at the external premise may be managed (e.g., by the authorized administrator or other authorized VCS clients) just like any other IVN resource in various embodiments—e.g., networking and/or other configuration settings (such as virtual network interfaces) of the server may be modified in response to programmatic requests received at the VCS control plane. The various messages exchanged between the VCS control plane and the external-premise components (e.g., the TM and the PCED) during the workflow described above may each comprise one or more packets in various embodiments, and may be formatted according to any desired networking protocol such as TCP/IP (Transmission Control Protocol/Internet Protocol) or the like.

In at least some embodiments, further security measures may be taken even after the server has been incorporated into the target IVN. For example, the TTD may have to remain attached to the PCED in order for the server to remain configured in the target IVN in some embodiments. In one implementation, the PCED may periodically (e.g., once every T seconds, where T is a parameter selectable by the client on whose behalf the server is being configured, or selectable by the VCS control plane) check the presence of the TTD and re-verify the TTD's identity. In at least some implementations, as yet another security measure, the PCED may also have to periodically provide evidence of its identity to the TTD—e.g., a handshake protocol may be implemented in which a TTD and a PCED periodically authenticate each other. In some embodiments, if the PCED detects that an authenticated TTD is no longer connected to the PCED, the PCED may send messages to the VCS control plane which cause the server to be disconnected from or un-configured from the target IVN. In one implementation, a TTD need not remain attached to a PCED after the server has been configured within an IVN with the help of a token obtained from the TTD.

A record of an association of a given security token with a given PCED may be stored at the VCS control plane in some embodiments, so that the same token cannot be used with other PCEDs to add other servers to the VCS. In some implementations, the maximum number of times that a given token can be used to add a server to an IVN may be set to one at the VCS control plane. Note that over the course of time, different tokens may be written to the same TTD in at least some embodiments. For example, for some weeks or months, a given TTD may be used to attach a server S1 to an IVN IVN1; then, after the client on whose behalf S1 was added to IVN1 determines that S1 no longer needs to be in IVN1, that TTD may be taken to the token manager and a different token for another server S2 and another IVN IVN2 may be written to the TTD and used to attach S2 to IVN2, and so on. A given TTD may be used to incorporate several different servers into the same IVN over time (using distinct tokens generated at a TM for each of the servers) in some embodiments, although only one server can be added to (and remain within) an IVN at a given time with the help of the TTD. In some embodiments, when a given TTD is inserted into a slot at a TM, the identity of the TTD may be verified (e.g., using an immutable cryptographic key pair of the TTD) and a record of the verification of the identity of the TTD may be stored at the VCS control plane resources.

In various embodiments, as long as the server remains part of an IVN, the PCED may send network packets/messages generated at the server to various destinations, and receive packets/messages directed to the server from various sources. As such, the PCED may be considered a packet processing intermediary of the server. In some embodiments, the PCED may send packets generated at the server to other data plane resources of the target IVN (e.g., using an encapsulation protocol of the VCS), some of which may be located at data centers of the provider network; the PCED may also transfer packets received from other resources of the target IVN to the server. In one embodiment, an optimized pathway may be used to send packets generated at the server to other servers also located at the same premise and incorporated into the VCS data plane (e.g., using respective PCEDs and TTDs for each of the servers). For example, instead of sending packets to another server of the data plane extension via the devices and links of the provider network, the PCED may send such packets using local network paths of the external premise (and receive packets in the reverse direction before forwarding them on to the server). In at least one embodiment, the PCED may also act as an intermediary between the VCS and resources at the external premise which are not part of a VCS data plane extension—e.g. packets between the server and resources in the external premise's local network may be transferred in both directions via the PCED.

Example System Environment

FIG. 1 illustrates an example system environment in which servers located at a premise external to a provider network's data centers may be configured, using a physical token-based multi-step security technique, within isolated virtual networks managed by control plane resources of the provider network, according to at least some embodiments. As shown, system 100 comprises resources and artifacts located at data centers of a provider network 101, which may be accessible via one or more intermediary networks 155 from an external premise 130 at which a client-selected server 131 is to be configured such that it can be managed using programmatic interfaces associated with isolated virtual networks (IVNs). The provider network may include a variety of network-accessible services, including at least a VCS 110 in the depicted embodiment. The VCS 110 may comprise a set of control plane resources 141, such as control plane servers 102A, 102B and 102C, as well as a set of data plane resources 145. At least some of the data plane resources 145 may be subdivided across a plurality of IVNs in the depicted embodiment, such as IVN 115A and IVN 115B. Some IVNs 115 may include virtualization servers, such as virtualization server 117, located at the data centers of the provider network, which may be used to host compute instances (such as virtual machines, bare-metal instances, and the like) as desired. Other types of data plane resources may also be configured within IVNs in various embodiments, such as inter-service access gateway 119, which may be used to access a publicly-accessible storage service or other services of the provider network from within an IVN such as IVN 115A without using the public Internet.

Configuration metadata pertaining to each of the IVNs, such as metadata 118A and metadata 118B, may be stored at the data centers of the provider network in the depicted embodiment. Such metadata may include, for example, networking settings (subnets, security rules for inbound and outbound traffic, etc.) selected by a client on whose behalf the IVN was established. In addition to the data plane configuration metadata such as 118A and 118B, in various embodiments metadata may also be stored at the control plane for the IVNs—e.g., when an IVN is created at the request of a client, a record indicating the IVN may be stored at the VCS control plane, and when a new resource is added to the data plane of an IVN, metadata indicating that resource may be stored at the control plane. At the time that an IVN is created, a subnet and/or a minimal set of other networking configuration information for the IVN may be stored at the VCS along with a set of control plane metadata, but the IVN may not necessarily have a virtualization server 117 or other data plane resources within the data centers of the provider network in some embodiments; data plane resources may be added later (e.g., including resources located within the provider network and/or located at external premises).

The external premise 130, which may for example comprise a data center owned/managed by a client of the VCS, may include at least one client-selected server 131 to be incorporated into an IVN managed by the VCS, at least one token manager (TM) workstation 138, and at least one private-network connectivity enabler device (PCED) 132 in the depicted embodiment. The external premise may also include some number of non-VCS servers 133, which are not part of the VCS and which the client does not wish to have incorporated into the VCS. At least the TM 138, the PCED 132, and the non-VCS servers 133 may be linked to a local-premise network 137 in the depicted embodiment, and the PCED 132 may be connected to the client-selected server 131 via a network link 136. Link 136 may comprise a physical cable (such as a Cat5 or Ethernet cable) in some embodiments; in other embodiments, an over-the-air link 136 (such as a wi-fi link) may be used to connect the PCED 132 to the server 131. In one embodiment, prior to the initiation of a workflow to include the server 131 as a part of the VCS, the server 131 may also be connected to the local-premise network, for example using a Cat5/Ethernet cable. Then, after the client makes a decision to extend the data plane of the VCS to the external premise by adding server 131 to an IVN, the PCED may be introduced as an intermediary between the server 131 and the local-premise network 137 (e.g., by connecting a Cat5 cable from the server to the PCED, and another Cat5 cable from the PCED to the local-premise network 137).

The TM 138 and the PCED 132 may each separately establish network connectivity with the VCS control plane, e.g., as soon as they are powered on and can send packets to the VCS control plane in the depicted embodiment via the combination of the local-premise network 137 and the intermediary networks 155. In at least some embodiments, the TM and the PCED may each have an associated cryptographic key pair, and a security protocol using the key pair may be used by each of these devices to provide evidence of their respective identities to the VCS control plane. The VCS control plane resources 141 may, for example, store a list of public keys for TMs and PCEDs which have been shipped to various clients, and so may utilize the public keys to verify the identities of the TM and the PCED. In some embodiments, the intermediary networks 155 may include portions of the public Internet. In other embodiments, instead of using the public Internet, a direct dedicated high-bandwidth physical link may be established between the external premise and one or more data centers of the provider network at the request of the client; such links may be referred to as "direct connect" links. Other types of intermediary networks/paths may be used for communications between the provider network data centers and the external premise 130 in different embodiments. In some embodiments in which the public Internet is used, tunneling protocols may be implemented to establish secure networking channels between the TM and the VCS and/or between the PCED and the VCS.

The TM may comprise a number of slots 139 into which portable and re-writable hardware token transfer devices (TTDs) may be inserted in at least some embodiments. In order to configure a given external-premise server such as 131 within an IVN (such as IVN 115B or 115A), a token specific to the targeted IVN may have to be generated at the TM in the depicted embodiment, and then that token may have to be transferred via a TTD to the PCED connected to the target server 131.

An indication of a target IVN 115 for the server 131 may be obtained via a programmatic interface of the VCS at the VCS control plane resources 141 in the depicted embodiment. The information about the target IVN may, for example, be provided to the VCS control plane by an administrator of the external premise from any desired client-side device, such as a laptop, desktop, portable computing device, smart phone or the like, after the administrator has logged in to a console interface of the VCS (or otherwise provided evidence that the administrator has permissions to establish IVNs or change IVN configurations). The network pathway used to convey the identity of the target IVN may not include the TM 138 or the PCED 132 in some embodiments. In other embodiments, the TM 138 may provide a user interface (e.g., a console) which can be used to log in/authenticate an administrator to the VCS and/or to select an IVN from a list of available IVNs of the client. In one embodiment, the authorized administrator may create an IVN 115 just before sending the information to the VCS that an external-premise server is to be added to that IVN as a data plane resource. In one embodiment, the administrator may indicate that the external-premise server 131 is to be added to the VCS without specifying a particular IVN within which the server 131 is to be configured, and a new IVN may be created automatically by the VCS control plane to accommodate the server. In at least some embodiments, in addition to informing the VCS regarding the target IVN, an administrator may also indicate the identity of the specific server 131 which is going to be added to the target IVN (and/or the specific PCED 132 to be used for that server) to the VCS control plane.

After the VCS control plane 141 obtains an indication of a target IVN 115 to be used for a server 131 located at the premise 130 where a TM 138 has been configured, the VCS control plane may transfer one or more artifacts associated specifically with the target IVN 115 to the TM 138 in some embodiments. In at least one embodiment, the VCS control plane 141 may also notify the PCED 132 that a token is going to be generated and used to configure a server 131 attached to the PCED 132 within the target IVN. Thus, the identity of the target IVN 115 as well as the client-selected server 131 may be known at both the TM 138 and the PCED 132 in at least some embodiments.

In some embodiments, the VCS control plane may also have a list of TTDs 134 (e.g., their identifiers and/or public keys) which have been assigned to the client at whose request the TM 138 has been set up at external premise 130. The administrator may be shown a list of TTDs, e.g., via a programmatic interface of the TM 138, and asked to select a particular TTD 134 to be used for configuring the server 131. After the administrator selects the TTD 134, the administrator may be requested to insert the selected TTD 134 in a particular slot of the TTD slots 139 of the TM in some embodiments. The identity of the TTD itself may be verified at this stage by the VCS control plane in some embodiments—e.g., a message signed using a private key assigned to the TTD 134 may be sent to the VCS control plane by the TM and decrypted at the VCS control plane using the TTD's public key.

The artifacts sent from the VCS control plane 141 may then be used by the TM 138 to generate a security token (or tokens) and write the tokens to the TTD 134 which was inserted into one of the TM's TTD slots 139 in the depicted embodiment. In some embodiments, the information written to the TTD may include data which can be used to verify the identity of the specific PCED 132 to be used for the server 131. The TTD may then be extracted from the TM, physically transported to the PCED, and inserted into a hardware input port 135 of the PCED (e.g., a Universal Serial Bus port or another type of port). In some embodiments, a handshake protocol may be implemented between the PCED and the inserted TTD, in which both devices identify themselves and verify the identity of the other. The security token may be extracted from the TTD by the PCED 132 and processed at the PCED 132 to ensure that it is valid and associated with the target IVN 115 (about which the PCED was informed earlier by the VCS control plane). In some implementations, the TM 138 may assign a short-duration validity to the token and provide an encrypted indication of the validity on the TTD (e.g., as part of the token, or in another encrypted object), and the PCED may verify that the validity period of the token has not expired. The PCED 132 may also re-verify its connectivity to the server 131 in at least some embodiments. The PCED 132 may generate and send one or more messages or packets to the VCS control plane in various embodiments. The messages/packets may indicate that the security token generated at the TM 138 using artifacts associated with the target IVN 115 has been transferred to the PCED 132, and that at least one network path exists between the target server 131 and the PCED 132.

In response to receiving this information from the PCED 132, the VCS control plane may store metadata indicating that the server 131 has been configured as a data plane resource of the target IVN 115 in the depicted embodiment.

One or more network address(es) and/or virtual network interfaces of the target IVN may, for example, be assigned to the target server in some embodiments as part of the operations performed to configure the server. A virtual network interface may comprise a transferable object with one or more network addresses and other network properties, which can be dynamically attached to, or detached from, resources such as servers and compute instances without having to modify the properties of physical network interface cards (NICs). After the server 131 has been configured within the IVN 115, programmatic requests directed to the VCS control plane (e.g., by the client on whose behalf the server was added to the IVN) may be used to change configuration settings of the server 131, e.g., to set up compute instances at the server, to utilize the server as an access gateway to other services of the provider network, to change/add network addresses or virtual network interfaces of the server, and so on. The PCED may process inbound and outbound packets of the server 131, e.g., implementing an encapsulation protocol of the VCS as needed.

In some embodiments, in order for the server 131 to continue to remain configured within the target IVN, the TTD 134 may have to remain inserted in the port 135 of the PCED 132. The PCED 132 may periodically (e.g., after an interval whose duration is a parameter selected by the client or by the VCS control plane) re-verify the identity of TTD 134 in such embodiments. If the TTD is no longer present, or if its identity cannot be verified, the PCED may inform the VCS control plane accordingly. If the VCS control plane does not receive periodic messages from the PCED indicating that a verified TTD remains inserted into the PCED, the server 131 may be disconnected or un-configured from the target IVN in some embodiments.

Using the token-based security techniques described, which require the physical presence of authorized administrators at the external premise at or near the time that a server is added to an IVN, extensions of the data plane of VCS 110 to premises outside the provider network data centers may be accomplished with high levels of security. In some embodiments, to add further security and auditability, each interaction between the VCS and the security components at the external premise (the TM, the PCED and the TTD) may be logged at persistent storage, e.g., at event logs 198, and entries within such logs may be provided to the VCS client on whose behalf the IVN 115 is set up if desired by the client. In at least one implementation, before any configuration changes are saved at the VCS control plane regarding a data plane extension (e.g., before saving a metadata entry indicating that server 131 has been configured as a data plane resource), the VCS control plane verify that corresponding log records indicating the about-to-be-saved changes have already been made persistent. The records stored at event logs 198 may provide a mechanism for comprehensive auditing of operations performed with respect to data plane extensions of the VCS.

In at least some embodiments, a given TM 138 may comprise one or more processors and a memory in addition to the TTD slots 139. The memory may comprise instructions which when executed on the processors implement various TM functions described above—e.g., establishing network connectivity with the VCS control plane, providing information about the TM's identity to the VCS control plane, obtaining information from the VCS regarding IVNs and TTDs, verifying TTD identities, obtaining IVN-specific artifacts from the VCS control plane and using them to generate security tokens, transferring the tokens to TTDs, and so on. In one embodiment, the TM may also comprise a display device which can be used, for example, by an administrator of premise 130 to view/select IVNs, or log in to the VCS.

In at least some embodiments, a given TM 132 may comprise one or more processors, a memory and at least one hardware input port 135. The memory may comprise instructions which when executed on the processors implement various PCED functions described above—e.g., establishing network connectivity with the VCS control plane, providing information about the PCED's identity to the VCS control plane, obtaining information from the VCS regarding IVNs and TTDs, verifying TTD identities, obtaining security tokens from TTDs, preparing and sending packets to the VCS control plane indicating that a token has been obtained from a TTD, re-verifying the identity and presence of the TTD, and so on. In some embodiments, a PCED may be inserted into a network interface card (NIC) slot of a server 131. In other embodiments, a server may be connected to a PCED via an Ethernet cable, a Peripheral Component Interconnect (PCI) or a PCIe (PCI-express) cable, or other physical cable. In one embodiment, the PCED may function at least in part as a router at the external premise 130, e.g., as a wi-fi router. In one embodiment in which the server 131 is configured as a virtualization server of the VCS, a PCED may include one or more virtualization offloading cards (which offload at least some of the processing overhead associated with managing compute instances from the primary CPUs of the server 131), local persistent storage devices, and/or additional ports (in addition to the TTD port 135) such as one or more external PCIe ports, one or more small form-factor ports (SFPs), or RJ45 (Registered Jack 45) ports. In at least some embodiments, a PCED 132 may be packaged in a separate physical enclosure or encasing than the client-selected server 131 which is to be added to an IVN 115.

In at least some embodiments, a given TTD 134 may comprise one or more processors and a memory. The memory may comprise instructions which when executed on the processors implement various TTD functions described above, such as participating in a period handshake protocol with the PCED, providing TTD identity information to a TM and/or to the VCS control plane, and so on. In some embodiments, a TTD 134 may be similar in size and appearance to a small-form-factor USB drive.

Overview of Workflow for Extending Service Data Plane

Figure 2:
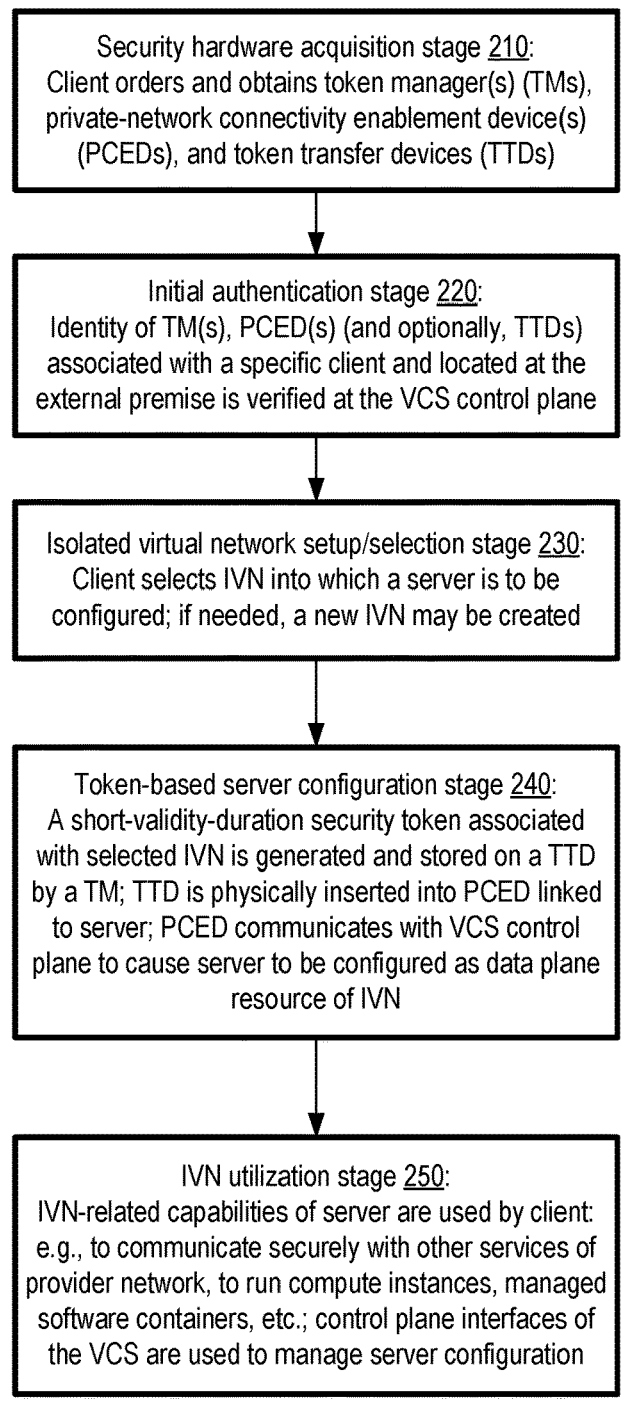
FIG. 2 illustrates an overview of a workflow for configuring and using servers at premises outside a provide network as resources within isolated virtual networks managed by the provider network, according to at least some embodiments.

FIG. 2 illustrates an overview of a workflow for configuring and using servers at premises outside a provide network as resources within isolated virtual networks managed by the provider network, according to at least some embodiments. In a security hardware acquisition stage 210 of the workflow, a client of a VCS may order and obtain one or more TMs, PCEDs, and TTDs at a selected location external to the provider network data centers in the depicted embodiment. In some embodiments, a respective TTD and PCED may be required for each of the servers which are to be added to the IVNs, but a TM may be used for generating tokens for multiple servers.

In an initial authentication stage 220, network connectivity may be established between the VCS (e.g., the VCS control plane) and the TMs and PCEDs of the client, and the identities of the TMs and PCEDs may be verified at the VCS in various embodiments. In some embodiments, network connectivity between the TTDs and the VCS may also be established at this stage (e.g., via a TM), and the identity of the TTDs may also be verified. The VCS may maintain a database indicating the specific TMs, PCEDs and/or TTDs which were ordered by and/or shipped to different VCS clients, and such a database may be used to verify the identities of the various components. In at least some embodiments, as discussed in the context of FIG. 3, a respective immutable cryptographic key pair may be assigned to (or embedded in hardware within) each TM, PCED and/or TTD, with the public keys of the key pairs known to the VCS, and such key pairs may be used to verify the identities.

In an IVN setup/selection stage 240, a client selects a particular IVN within which a particular server located at an external premise is to be configured in the depicted embodiment. A client may, if desired, add the server to an IVN which was created earlier and already has other data plane resources set up (including, potentially, other servers at the same external premise). Alternately, a new IVN may be created just before the server is configured within it.

In a token-based server configuration stage 240, a short-validity-duration security token which is associated with the selected IVN may be generated and stored on a particular TTD by a TM. The token may only be usable for the selected IVN, and/or may only be usable at a particular PCED for a particular server in at least some embodiments. If the client attempts to use the token for a different IVN or a different server, the VCS control plane may be able to detect this and reject the attempted configuration in such embodiments. The TTD containing the token is then physically inserted into a PECD linked to the server. After verifying the validity of the token, the PCED may communicate with the VCS control plane to cause the server to be configured as a data plane resource of the selected IVN in various embodiments. In at least some embodiments, operations of the token-based server configuration stage may have to be performed for each server which is to be added to an IVN—e.g., if a client wishes to add ten servers at an external premise to the same IVN, ten different tokens may have to be generated, and ten PCEDs (each linked to a respective server) and ten TTDs may have to be used.

In IVN utilization stage 250, various IVN-related capabilities of the server may be used by the client. For example, the server may be used to communicate securely with other resources and services of the provider network (such as a storage service), to host compute instances, managed software containers, and so on. Control plane programmatic interfaces of the VCS may be used by the VCS client to manage and if desired change the configuration of the server in various embodiments. In effect, responsibility for much of the detailed work associated with managing the server (verifying that the server is healthy and responsive, logging events associated with the server, storing records of network traffic of the server, etc.) may be transferred from the local administrators of the external premise to the VCS control plane, and the server may be managed with similar ease as other provider network resources.

Example Identity Verification Techniques

Figure 3:
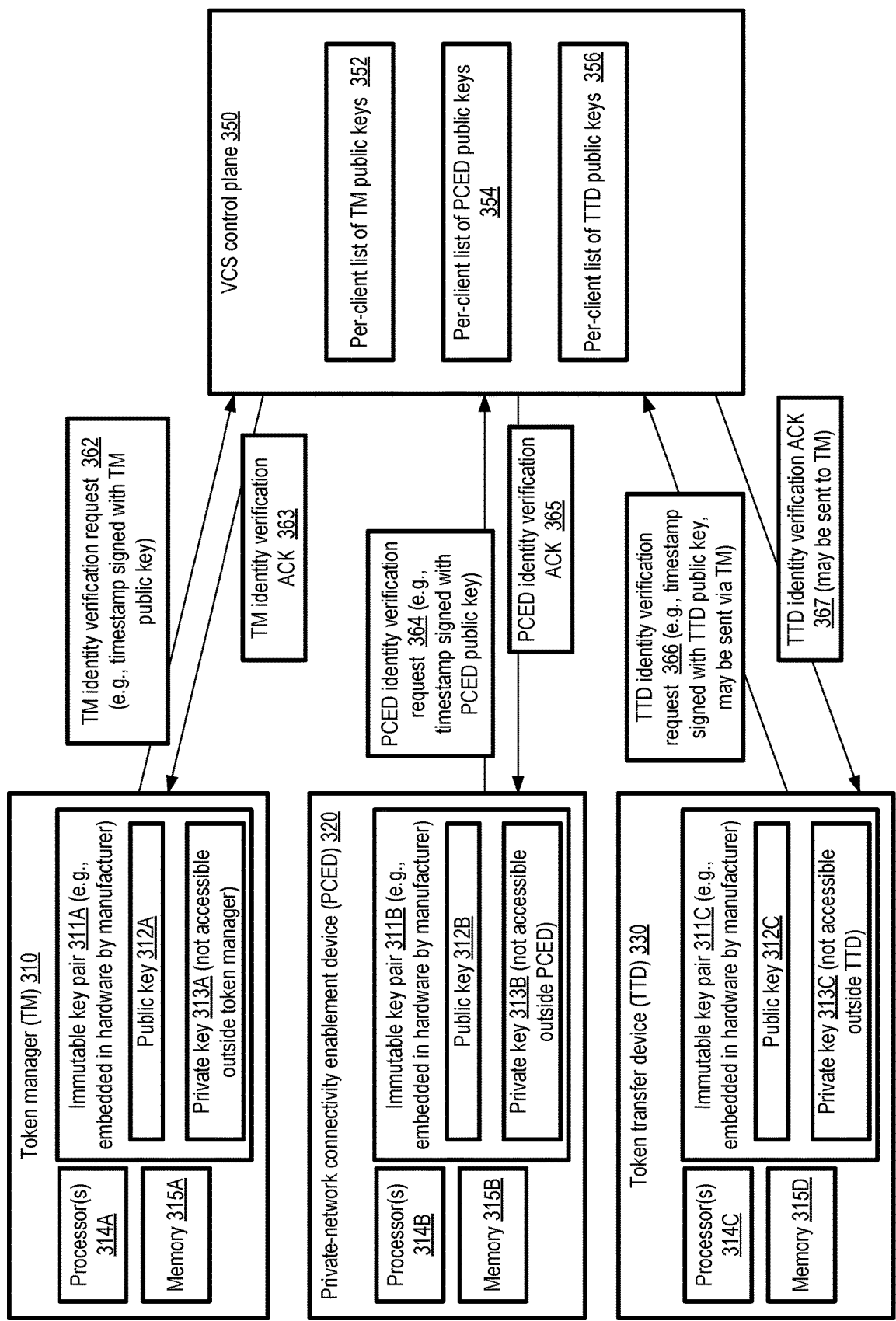
FIG. 3 illustrates example identity verification techniques for hardware components used for securely configuring servers located at premises outside a provider network, according to at least some embodiments.

FIG. 3 illustrates example identity verification techniques for hardware components used for securely configuring servers located at premises outside a provider network, according to at least some embodiments. In the depicted embodiment, a token manager (TM) 310, a private-network connectivity enablement device (PCED) 320 and a token transfer device (TTD) 330, each implemented using respective hardware and software, may collectively be employed to enable a server located at an external premise to be configured within a VCS.

TM 310, PCED 320, and TTD 330 may each comprise one or more processors 314 (e.g., 314A, 314B or 314C), a respective memory 315 (e.g., 315A, 315B or 315C), and a respective immutable cryptographic key pair 311 (e.g., 311A, 311B or 311C). In at least some implementations, one or both of the keys may be embedded in hardware by the manufacturer(s) of the TM, the PCED and the TTD. The key pair 311 may be permanently associated with the respective device (TM, PCED or TTD) in at least some embodiments; that is, it may not be possible to associate a different key pair with any of the devices than the one originally assigned to and/or embedded in the devices. In various embodiments, the public key 312 of a key pair 311 associated with a given device may be used, in effect, as the logical equivalent of an identifier of the device (although in at least some embodiments, one or more of the devices may also have a respective unique identifier other than the public key 312). The private keys 313B of the key pairs 311 may not be exposed or transmitted outside the devices in at least some embodiments.

The VCS control plane 350 may obtain and store per-client lists of TM public keys 352, PCED public keys 354, and/or TTD public keys in the depicted embodiment. A given client wishing to extend the VCS data plane using the techniques introduced above may be required to obtain at least one TM, at least one PCED and at least one TTD.

In at least some embodiments, when a TM 310 is installed at a premise external to the data centers of the provider network of which the VCS is a part, the TM may establish network connectivity to the VCS control plane 350 and submit a TM identity verification request 362 to the VCS control plane. In some embodiments, the TM's identity verification request 362 may be sent as part of a workflow used to establish a secure communication channel (e.g., in accordance with a security protocol similar to Transport Layer Security or TLS) with the VCS control plane. In one embodiment, in order to indicate its identity, the TM may generate a timestamp representing the current time of day, use its private key 313A to digitally sign a message containing at least the timestamp, and send the signed message to the VCS control plane 350. In some embodiments, the message sent to the VCS control plane may also provide an indication of the client (e.g., a client account identifier) on whose behalf the TM is set up. At the VCS control plane, the TM's public key 312A, obtained from the list of TM public keys of the client, may be used to decrypt the signed message and verify the identity of the TM in the depicted embodiment. An acknowledgement message 363 indicating that the TM has been authenticated at the VCS may be sent back to the TM in some implementations. In some embodiments, the TM identity verification request 362 may be sent shortly after the TM is powered on at the external premise and is able to detect availability of a network path (e.g., via the public Internet, a direct-connect link) to the VCS control plane.

Similarly, in at least some embodiments, when a PCED 320 is installed at a premise external to the data centers of the provider network of which the VCS is a part, the PCED may establish network connectivity to the VCS control plane 350 and submit a PCED identity verification request 364 to the VCS control plane. In some embodiments, the PCED identity verification request 364 may be sent as part of a workflow used to establish a secure communication channel (e.g., in accordance with a security protocol similar to Transport Layer Security or TLS) with the VCS control plane. In one embodiment, in order to indicate its identity, the PCED may generate a timestamp representing the current time of day, use its private key 313B to digitally sign a message containing at least the timestamp, and send the signed message to the VCS control plane 350. In some embodiments, the message sent by the PCED to the VCS control plane may also provide an indication of the client (e.g., a client account identifier) on whose behalf the PCED is set up. At the VCS control plane, the PCED's public key 312B, obtained from the list of PCED public keys of the client, may be used to decrypt the signed message and verify the identity of the PCED in the depicted embodiment. An acknowledgement message 365 indicating that the PCED has been authenticated at the VCS may be sent back to the PCED in some implementations. In some embodiments, the PCED identity verification request 364 may be sent shortly after the TM is powered on at the external premise and is able to detect availability of a network path (e.g., via the public Internet, a direct-connect link) to the VCS control plane. In at least one implementation, the PCED need not necessarily be connected or linked to the server which is to be added to the VCS at the time that the PCED identity verification request 364 is sent, or when the acknowledgement 365 is received. In other implementations, the PCED may have to be connected to the server at the time that the PCED identity verification request 364 is sent, and the request 364 may include information about the server.

In some embodiments, a TTD identity verification request 366 may also be sent to the VCS control plane 350. However, the TTD may only be able to communicate with the VCS control plane 350 via some intermediary device (such as a TM or a PCED) in the depicted embodiment. In some embodiments, the TTD identity verification request 366 may be sent when the TTD is inserted into the TM at which a token to be transferred via the TTD is generated; that is, a network connection or channel already established between the TM and the VCS control plane may be used. A message signed with the TTD's private key 313C (and then re-signed with the TM's private key 313A) may be used to provide evidence of the TTD's identity in some embodiments. After the VCS control plane 350 verifies the TTD's identity, e.g., using the TTD's public key 312C to decrypt the signed message, a TTD identity verification acknowledgement message 367 may be sent in some implementations.

In at least one embodiment, prior to the time that the PCED 320 and the TTD 330 are used to add a server to the VCS, the VCS control plane may send one or more messages to the TM 310, the PCED 320 and/or the TTD 330, informing the recipient device about the other devices that are going to participate in the configuration of the server. For example, the PCED may be informed about the identity of the TM and the TTD; the TM may be informed about the PCED and the TTD; and the TTD may be informed about the TM and the PCED. In some implementations, the public keys of the other two devices may be provided by the VCS to each of the devices—e.g., the PCED may receive the public keys of the TM and the TTD, the TM may receive the public keys of the PCED and the TTD, and the TTD may receive the public keys of the PCED and the TM. Such public keys may then be used for decrypting messages at the PCED, the TTD and/or the TM. In other implementations, such information about the identities of the other devices may not be provided by the VCS control plane.

In some embodiments, digital certificates issued by trusted certification authorities (or a chain of such authorities), certifying the ownerships of the public keys 312, may also be used to verify the identities of the TM 310, the PCED 320 and/or the TTD 330. In one embodiment, techniques which do not use cryptographic key pairs and/or digital certificates may be used.

Methods for Incorporating External-Premise Servers into Service Data Planes

Figure 4:
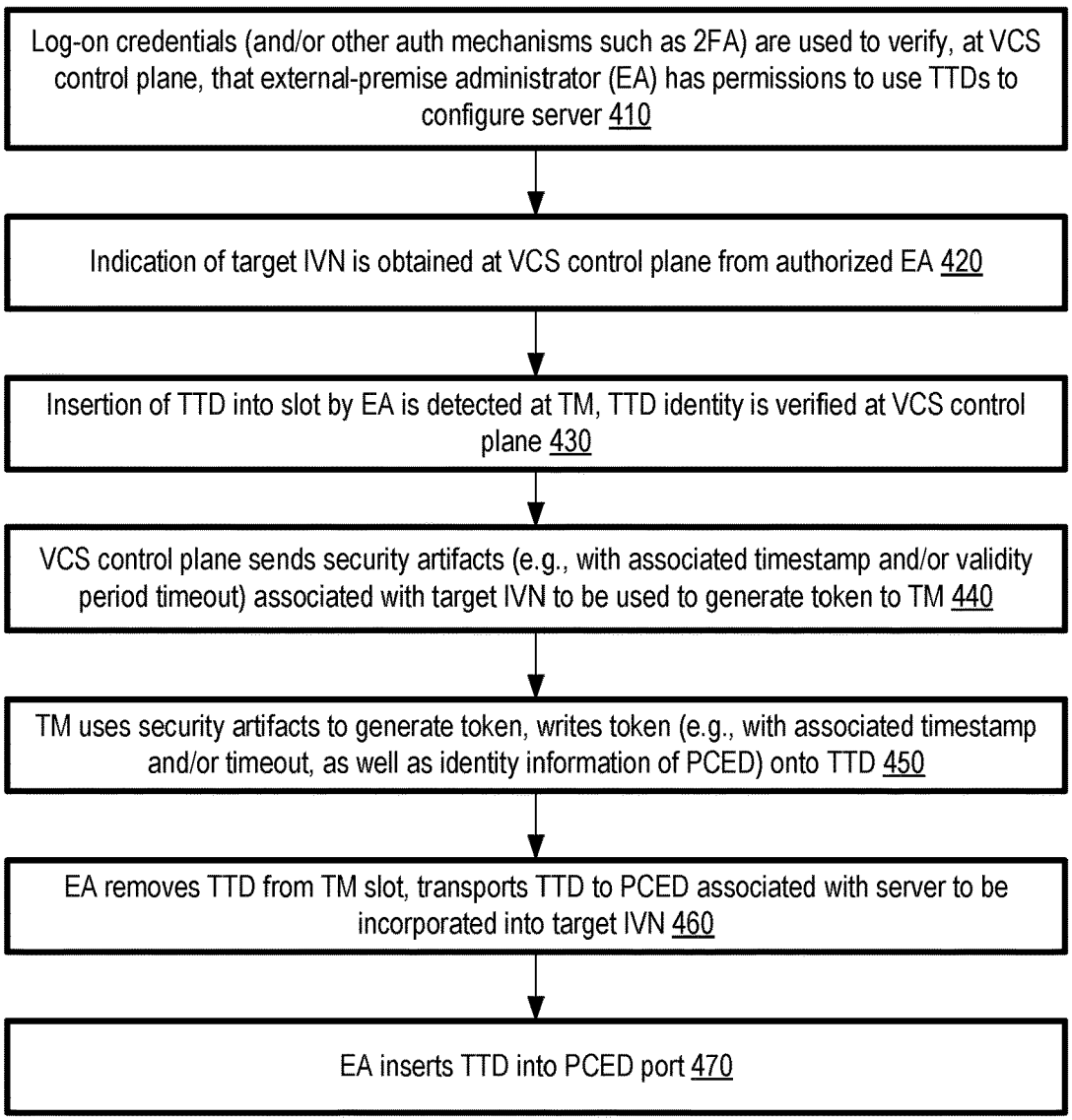
FIG. 4 illustrates an example workflow for generating security tokens for server configuration at a premise outside a provider network, according to at least some embodiments.

FIG. 4 illustrates an example workflow for generating security tokens for server configuration at a premise outside a provider network, according to at least some embodiments. In the depicted embodiment, an external-remise administrator (EA) may be required to be physically present at/near a TM and then at/near a PCED in order to configure the server. As shown in element 410, log-on credentials and/or other pre-selected authentication mechanisms such as two-factor authentication (in which, for example, a code may be sent to a phone or an authenticator program, and that code has to be provided to the VCS via a programmatic interface) may be used to verify, at the VCS control plane, that the EA has permissions to use TTDs to configure one or more servers.

An indication of the target IVN within which a server at the external premise is to be incorporated may be received at the VCS control plane from the EA (element 420) in the depicted embodiment. In some implementations, a TM may provide an interface such as a graphical console, and a list of IVNs set up for the VCS client account on whose behalf the TM is set up may be presented or displayed via such an interface; the EA may then choose a particular IVN from the list. In other implementations, the EA may send an indication of the selected IVN from some other device (e.g., a laptop, tablet, desktop, phone, etc.) to the VCS control plane. In one embodiment, the EA may submit a programmatic request to create a new IVN to the VCS control plane, and inform the VCS that the newly created IVN is to be used for a VCS data plane extension at the external premise.

The EA may insert a selected TTD into a slot of the TM in the depicted embodiment, and the TM may detect the TTD (element 430). In some embodiments, prior to the insertion of the TTD into the slot, a list of TTDs assigned to the client may be presented to the EA by the VCS control plane (e.g., via a TM console of the kind mentioned above, or via some other interface), and the EA may select a particular TTD from that list to be used for a particular server. The identity of the TTD which is inserted may be verified at the VCS control plane, e.g., using an approach similar to that discussed in the context of FIG. 3.

The VCS control plane may send one or more security artifacts associated specifically with the target IVN to the TM (element 440), which can be used at the TM to generate a security token to be transferred via the TTD to a PCED. In some embodiments, the VCS control plane may also send a timestamp indicating when the security artifacts were generated and/or a validity time period for the security artifacts. The contents of the security artifacts may ensure that the security artifacts cannot be used to configure server within any other IVN than the target IVN in the depicted embodiment.

The TM may use the security artifacts to generate a token (element 450), and the token may be written to the inserted TTD by the TM. In at least some embodiments, a short-term validity interval for the token may also be indicated in the TTD (e.g., either in the token itself or in associated metadata). In at least one embodiment, identity information of a PCED to which the token is to be provided (obtained at the TM from the VCS control plane) and/or a timestamp indicating when the token was generated may also be written to the TTD. In some embodiments, identification information of the TM may be written to the TTD (e.g., incorporated within the token, or separately).

After the token and associated metadata (if any) is transferred to the TTD, the EA may remove the TTD from the TM slot and transport the TTD to the PCED to be used with the server which is to be added to the target IVN (element 460). The EA may then insert the TTD into an input port of the PCED (element 470).

Figure 5:
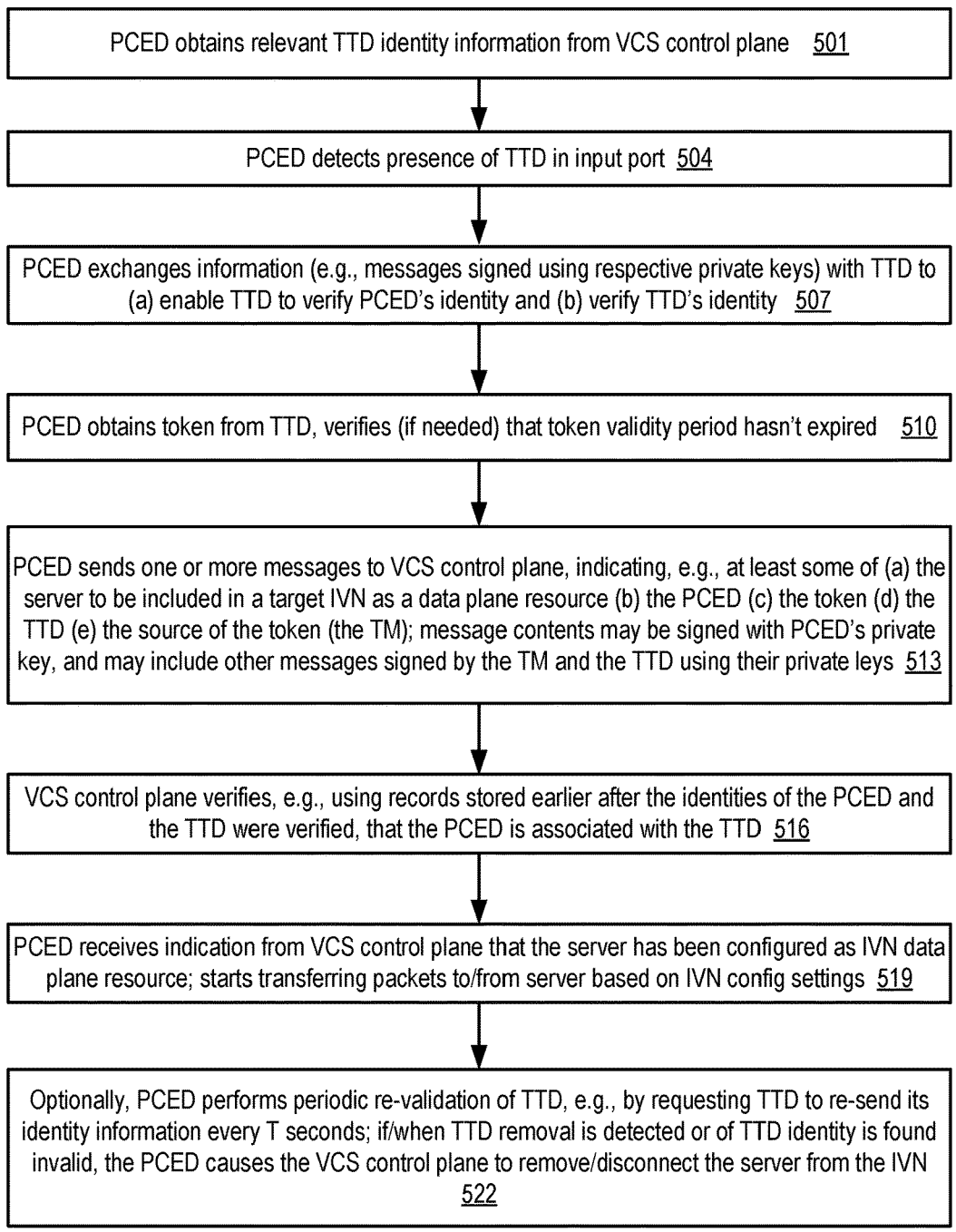
FIG. 5 is a flow diagram illustrating aspects of operations that may be performed at a private-network connectivity enablement device to cause a server to be configured within an isolated virtual network, according to at least some embodiments.

FIG. 5 is a flow diagram illustrating aspects of operations that may be performed at a private-network connectivity enablement device to cause a server to be configured within an isolated virtual network, according to at least some embodiments. As indicated earlier, the PCED may comprise one or more processors, a memory and at least one hardware input port into which a TTD can be inserted in some embodiments. The memory may store instructions which when executed on or across the processors implement at least some of the operations shown in FIG. 5.

As shown in element 501, the PCED may obtain information about the identities of relevant TTDs (i.e., one or more TTDs which have been provided to the same VCS client on whose behalf the PCED is to be used), e.g., from the VCS control plane. At some point, e.g., after an EA has transported a TTD with an appropriate security token generated by a TM, and inserted the TTD into the input port of the PCED, the presence of the TTD may be detected by the PCED (element 504).

In at least some embodiments, the PCED may then exchange information with the TTD, enabling the TTD to verify the identity of the PCED, and the PCED to verify the identity of the TTD (element 507). For example, in one embodiment, a message signed using the private key of the PCED may be sent to the TTD, and a message signed using the private key of the TTD may be received at the PCED; the public keys of the senders may be used to extract the contents of the signed messages and confirm the senders' identities.

The PCED may obtain the token from the TTD (element 510) in various embodiments. In embodiments in which the token has a validity period associated with it, the PCED may verify that the validity period has not expired.

After obtaining the token, the PCED may send one or more messages to the VCS control plane in the depicted embodiment (element 513). The message(s) may indicate, for example, one or more of the following: (a) the server, linked to the PCED, which is to be included in a target IVN; (b) the identity of the PCED; (c) the token; (d) the TTD used for the token; and/or (e) the source of the token (the TM). In some cases, a single data object or artifact included a message sent by the PCED to the VCS control plane may include or encode information about several of the entities (e.g., the token may be digitally signed by the TM, and the TM-signed token may be further digitally signed by the TTD). In at least some embodiments, the message contents may be signed with the PCED's private key, and hence may be extracted at the VCS control plane where the PCED's public key is known.

The VCS control plane may verify, e.g., using records stored earlier after the identities of the PCED and the TTD were verified, that the PCED is associated with the TTD in the depicted embodiment—that is, that the TTD was not inserted into a PCED for which the token in the TTD was not intended (element 516). Thus, even though the TTD and the PCED may have authenticated themselves to each other (in operations corresponding to element 507), an extra step of verification that the TTD and the PCED can be used together may be performed at the VCS control plane in at least some embodiments.

In at least some embodiments, the PCED may receive an indication from the VCS control plane that the server has been configured as a data plane resource of the targeted IVN (element 519). The PCED may then begin transferring data packets to/from the server based on the configuration settings of the IVN in the depicted embodiment.

In various embodiments, an additional security enhancement technique may be implemented by the PCED (element 522). The PCED may, for example, perform periodic re-validation of the TTD by requesting the TTD to re-send its identity information to the PCED once every T seconds (where T may be a tunable parameter). If/when the PCED detects a physical removal of the TTD or that the TTD's identity information is invalid, the PCED may cause the VCS control plane to remove or disconnect the server from the target IVN in some embodiments.

Figure 6:
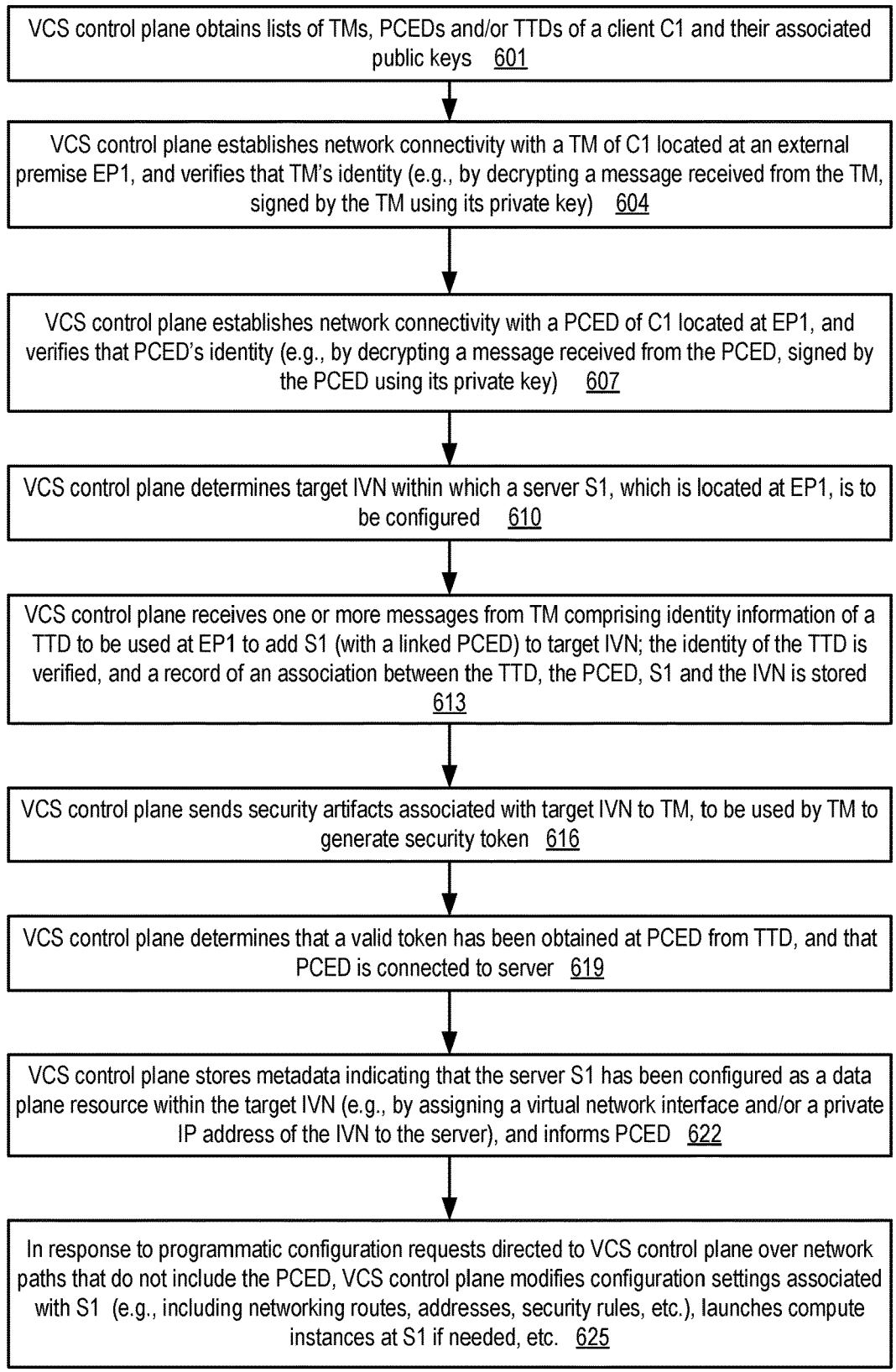
FIG. 6 is a flow diagram illustrating aspects of operations that may be performed at control plane resources of a provider network to cause a server to be configured within an isolated virtual network, according to at least some embodiments.

FIG. 6 is a flow diagram illustrating aspects of operations that may be performed at control plane resources of a provider network to cause a server to be configured within an isolated virtual network, according to at least some embodiments. As shown in element 601, lists of identifiers one or more TMs, PCEDs and/or TTDs of a client C1 of a VCS of a provider network may be obtained at VCS control plane resources in the depicted embodiment. Respective public keys of the TMs, PCEDs and/or TTDs may also be obtained in embodiments in which key pairs of the kind shown in FIG. 3 are used. Such lists of device identifiers and/or public keys may be obtained, for example, from fulfilment records for orders submitted by the client C1 to the operator of the VCS or provider network for the TMs, PCEDs and/or TTDs, or to some other organization(s) (such as the manufacturers of the devices) which in turn provides information about the fulfilment records to the VCS control plane.

Network connectivity may be established between the VCS control plane resources (which may be implemented at least in part at data centers of the provider network) and a TM of client C1, located at an premise EP1 which is external to the provider network in the depicted embodiment (element 604). The VCS control plane resources may verify the identity of the TM, e.g., by decrypting a message (signed using a private key of the TM, which is not known to the VCS control plane) received from the TM using a public key of the TM.

Similarly, network connectivity may be established between the VCS control plane resources and a PCED of client C1, also located at premise EP1 in the depicted embodiment (element 607). The VCS control plane resources may verify the identity of the PCED, e.g., by decrypting a message (signed using a private key of the PCED, which is not known to the VCS control plane) received from the PCED using a public key of the PCED. In some embodiments, different security or authentication protocols may be used for the PCED than are used for the TM.

The VCS control plane may determine (e.g., based on one or more programmatic requests from the client C1) a target IVN within which a server S1, located at EP1, is to be configured as a data plane resource (element 610). In some cases, the target IVN may be identified in a message sent to the VCS control plane using a path which does not involve a TM; e.g., the client may select an IVN via a web-based console implemented by the VCS control plane. In other cases, the TM may provide an interface or console which can be used to create IVNs, view lists of available IVNs, and/or select a target IVN, and the identity of the target IVN may be determined via the TM's interface.

As shown in element 613, the VCS control plane may receive one or more messages from the TM, comprising identity information of a particular TTD to be used at EP1 to add S1 (which has an associated PCED) to the target IVN in various embodiments. Such messages may be sent, as discussed earlier, from the TM to the VCS control plane after a TTD is inserted into a slot of the TM in some embodiments. The identity of the TTD may be verified at the VCS control plane, and a record of an association between the hardware components (the TTD, the PCED, and/or S1) and the target IVN may be stored in at least some embodiments by the VCS control plane.

The VCS control plane resources may send one or more security artifacts associated with the target IVN to the TM, to enable the TM to generate a security token to be transferred to the PCED via the TTD in the depicted embodiment (element 616). At some point after the security artifacts have been sent to the TM, the VCS control plane may determine (e.g., based on one or more messages sent by the PCED) that a valid token generated at the TM using the security artifacts has been obtained at the PCED from the TTD, and that the PECD is connected or linked to the server S1 (element 619). This determination may be made, for example, after the TTD has been inserted into the PCED's input port and the PCED has participated in a handshake protocol with the inserted TTD. Note that in some embodiments, the token itself may not have to be received at the VCS control plane; instead, the VCS control plane may rely on the PCED to verify that the token is applicable to S1 and valid, and inform the VCS control plane accordingly. In other embodiments, the PCED may transmit the token to the VCS control plane.

After confirming that the token was successfully transferred to the PCED which was expected to be used for S1, the VCS control plane resources may store metadata indicating that S1 has been configured as a data plane resource within the target IVN in various embodiments (element 622). In some embodiments, in addition to storing an identifier of S1 in a metadata entry, a virtual network interface of the target IVN and/or a private IP (Internet Protocol) address of the target IVN may be assigned to S1. The PCED may be informed that the server has been successfully configured in at least some embodiments. After S1 has been added to the target IVN, it may be treated like other resources of the target IVN (and other IVNs) by the VCS control plane. For example, in response to configuration requests directed to the VCS control plane via paths that do not include the PCED, the VCS control plane may modify configuration settings associated with S1. Such configuration settings may include networking routes, security rules, IP addresses, attached virtual network interfaces, and so on. If desired by the client, one or more VCS-managed compute instances may be launched at S1 in at least some embodiments, in a manner similar to the way compute instances are launched at virtualization servers within the provider network data centers.

It is noted that in various embodiments, some of the operations shown in FIG. 2, FIG. 4, FIG. 5 and/or FIG. 6 may be implemented in a different order than that shown in the figure, or may be performed in parallel rather than sequentially. Additionally, some of the operations shown in these figures may not be required in one or more implementations.

Example Programmatic Interactions

Figure 7:
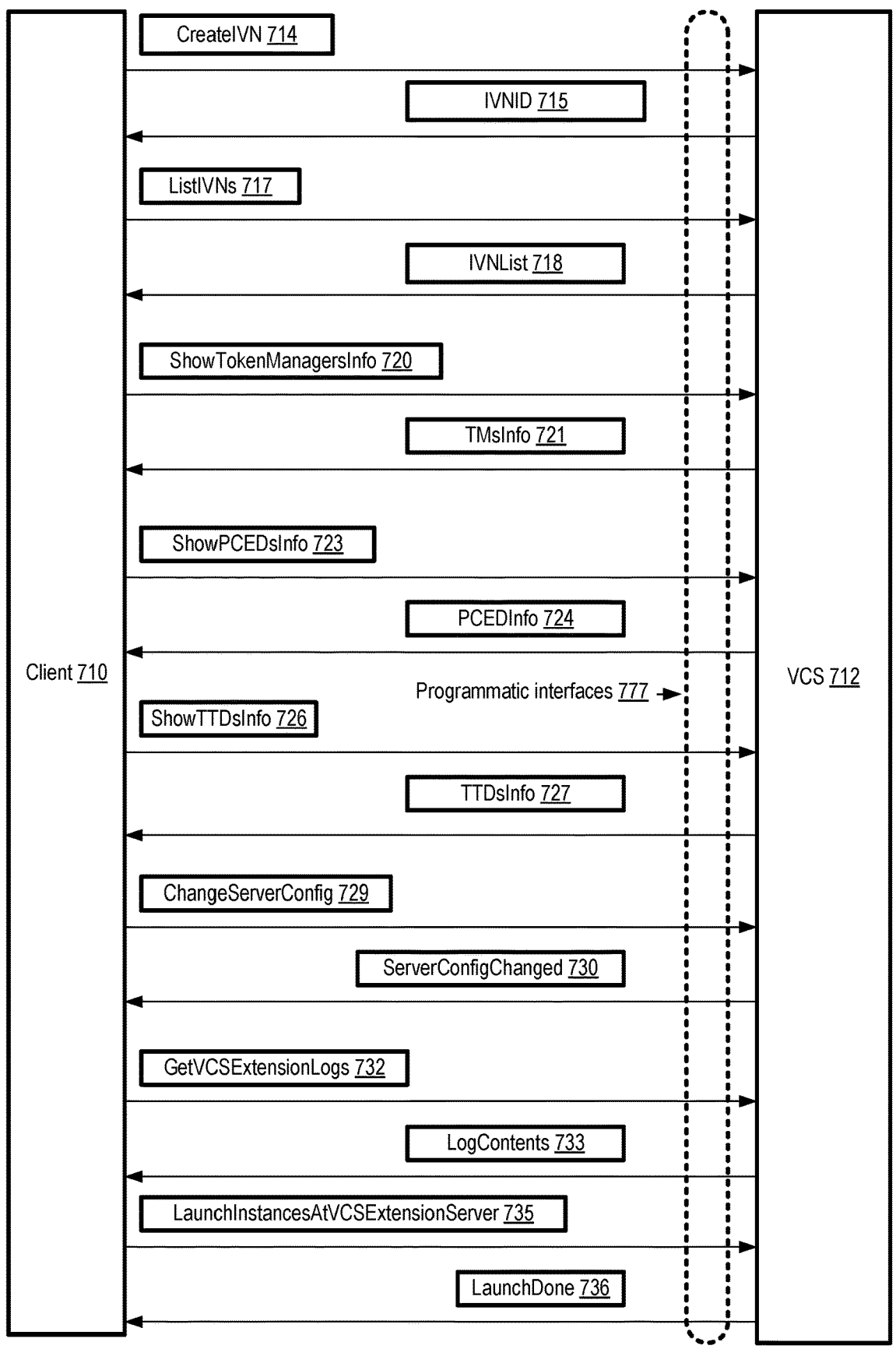
FIG. 7 illustrates example programmatic interactions pertaining to the configuration of client-selected servers within an isolated virtual network, according to at least some embodiments.

FIG. 7 illustrates example programmatic interactions pertaining to the configuration of client-selected servers within an isolated virtual network, according to at least some embodiments. In the depicted embodiment, a VCS 712, similar in functionality to VCS 110 of FIG. 1, may implement a set of programmatic interfaces 777 which can be used by clients 710 to submit various types of configuration-related requests to the VCS control plane and receive corresponding responses. Programmatic interfaces 777 may include, for example, one or more web-based consoles, application programming interfaces (APIs), command-line tools, graphical user interfaces, and the like. Clients 710 may utilize any desired type of network-connected computing device, such as a laptop, desktop, tablet, or phone to submit their programmatic requests in the depicted embodiment.

A client 710 may submit a CreateIVN request 714 in some embodiments to cause metadata representing a new IVN to be stored at the VCS control plane. An identifier IVNID 715 of the newly-created IVN may be sent to the client after the metadata has been stored. In some embodiments, the CreateIVN request for a particular IVN into which a server is to be configured may be sent very shortly before the token-based workflow to configure the server is initiated. An IVN may be created (at least initially) specifically for servers located at a premise outside the provider network data centers in some cases; later, as desired, other resources within or outside the provider network may be added to the IVN.

A ListIVNs request 717 may be submitted in various embodiments by a client to determine the set of IVNs that have been created for the client (and thus can potentially be used for configuring a remote-premise server). A list of the IVNs 718 may be provided in response by the VCS.

A client 710 may submit a ShowTokenManagersInfo request 720 to obtain information about TMs of the client in the depicted embodiment. Such information may include, for example, TM identifiers, locations to which the TMs were shipped, which TTDs have been used at the TMs, how many security tokens have been generated at the TMs, and so on. The requested information about TMs may be provided via one or more TMsInfo messages 721 in some embodiments.

A ShowPCEDsInfo request 723 may be submitted by a client 710 to obtain information about PCEDs of the client in various embodiments. Such information may include, for example, PCED identifiers, locations to which the PCEDs were shipped, whether the PCEDs are currently being used for connecting servers to IVNs (and if so, which IVNs), and so on. The requested information about PCEDs may be provided via one or more PCEDsInfo messages 724 in some embodiments.

ShowTTDsInfo requests 726 may be submitted by a client 710 to obtain information about TTDs of the client in some embodiments. Such information may include, for example, TTD identifiers, locations to which the TTDs were shipped, whether the TTDs are currently being used for connecting servers to IVNs (and if so, which IVNs and which PCEDs are involved), and so on. The requested information about TTDs may be provided via one or more TTDsInfo messages 727 in the depicted embodiment.

After a server has been incorporated within an IVN using the token-based techniques described earlier, a client may submit various types of ChangeServerConfig requests 729 to modify the server's configuration. For example, virtual network interfaces may be programmatically attached or detached from the server, private and/or public IP addresses may be assigned to the server, security rules for inbound/outbound traffic of the server may be set up or changed, and so on. After the requested configuration changes have been made at the VCS, a ServerConfigChanged message 730 may be sent to the client in some embodiments.

In at least one embodiment, as mentioned earlier, comprehensive log records may be generated and stored at the VCS with respect to operations performed with respect to TMs, PCEDs, and TTDs. In some embodiments, before any given configuration operation associated with TMs, PCEDs, or TTDs is performed at the VCS control plane (e.g., before security artifacts are sent to the TM), and/or before any message (or message response) is sent from the VCS control plane to any of these devices, the VCS control plane may ensure that a log record indicating the impending operation/ message/response is stored at a persistent storage device. A client 710 may obtain log records associated with TMs, PCEDs, and/or TTDs by submitting a GetVCSExtensionLogs request 732 in some embodiments via programmatic interfaces 777. The requested log information may be provided via one or more LogContents messages 733 in such embodiments.

In some embodiments, a client may wish to utilize a server at an external premise as a virtualization host, e.g., as a server at which one or more VCS compute instances can be launched. A LaunchInstancesAtVCSExtensionServer request 735 may be submitted in such embodiments, indicating a particular server (which was earlier added to an IVN using the token-based technique described earlier) and the type(s) of compute instance(s) to be launched at the particular server. After the requested compute instance(s) have been launched, a LaunchDone message 736 may be sent to the client in some embodiments. Additional types of programmatic interactions related to extending provider network services to external premises may be supported in some embodiments than are shown in FIG. 7.

Example IVN Configurations

Figure 8:
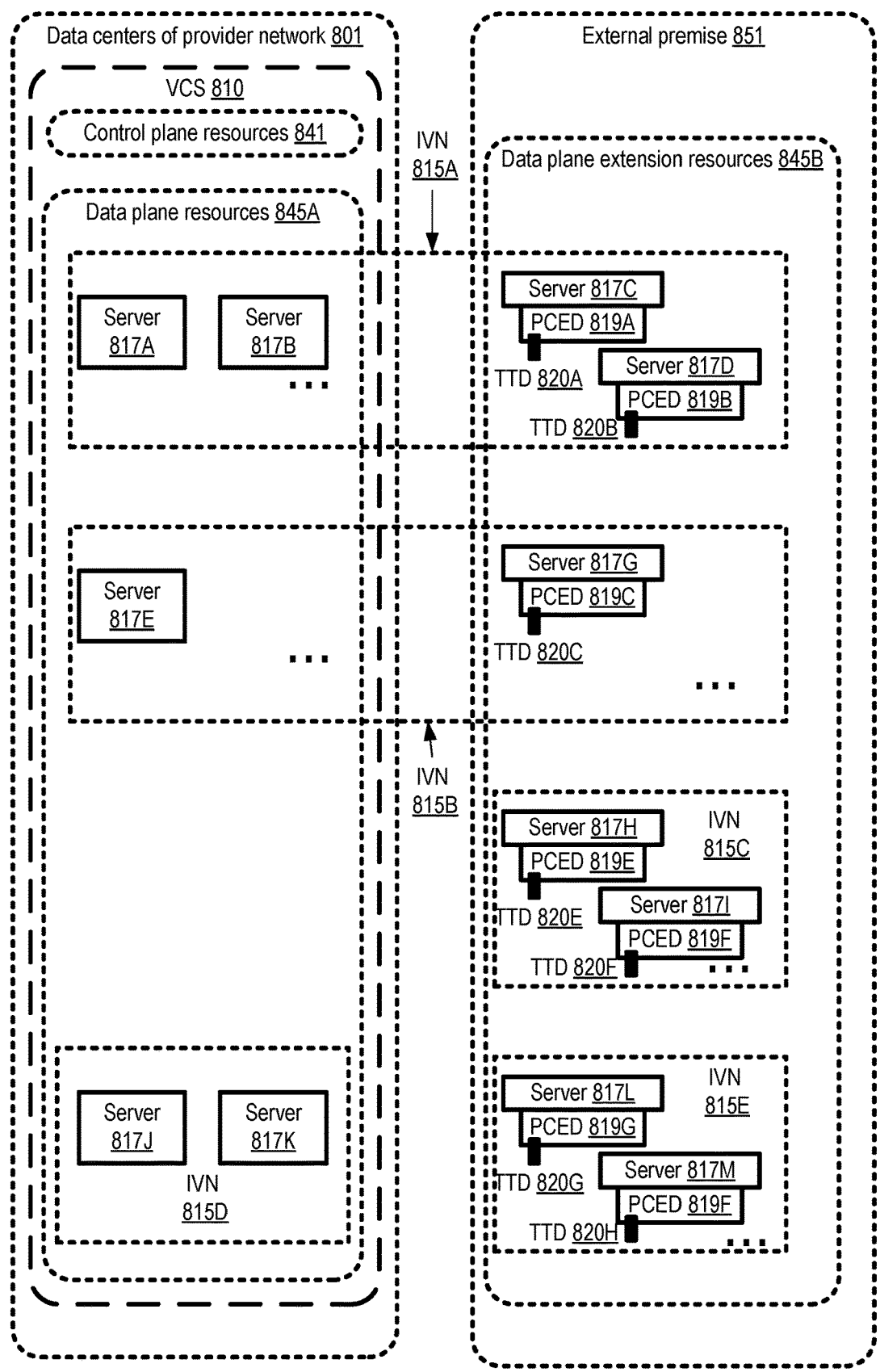
FIG. 8 illustrates example isolated virtual network data plane configurations, according to at least some embodiments.

FIG. 8 illustrates example isolated virtual network data plane configurations, according to at least some embodiments. In the depicted embodiment, control plane resources 841 of a VCS 810 may reside at one or more data centers of provider network 801.

A number of different kinds of IVNs may be configured at VCS 810 in various embodiments in response to client requests, with data plane resources distributed between or across the data centers 801 and external premises such as premise 851. For example, some IVNs, such as IVN 815A and 815B, may include a mix of data center-located data plane resources 845A and data plane extension resources 845B (located at external premise 851). IVN 815A may include servers 817A and 817B located at provider network data centers, and servers 817C and 817D located at external premise 851. Server 817C may be incorporated into IVN 815A using PCED 819A and TTD 820A, while server 817D may be incorporated into IVN 815A using PCED 819B and TTD 820B. IVN 815B may include servers 817E located at a provider network data center, and server 817G at external premise 851. Server 817G may be incorporated into IVN 815B using PCED 819C and TTD 820C.

The data plane resources of some IVNS established on behalf of a client may be located entirely within the external premise 851, and may not include any resources within the provider network data centers. For example, IVN 815C includes servers 817H and 817I located at premise 851, which utilize PCEDs 819E and 819F respectively, as well as TTDs 820E and 820F for their inclusion into the IVN 815C. Similarly, IVN 815E includes servers 817L and 817M located at premise 851, which utilize PCEDs 819G and 819H respectively, as well as TTDs 820G and 820H for their inclusion into the IVN 815C. Other IVNs, such as IVN 815D, set up on behalf of a client may include resources located only within the provider network data centers 801, such as servers 817J and 817K.

A client may wish to configure distinct sets of servers located at an external premise 851 within respective IVNs to segregate the network traffic associated with different applications in some embodiments. For example, servers 817H and 817I may be used for one set of related applications of the client, while servers 817L and 817M are used for a different set of related applications. The ability to configure servers located at a single external premise within different IVNs may thus help enable network isolation of applications being run at the external premise, using proven isolation capabilities of the VCS.

Example Traffic Flows Managed by PCEDs

Figure 9:
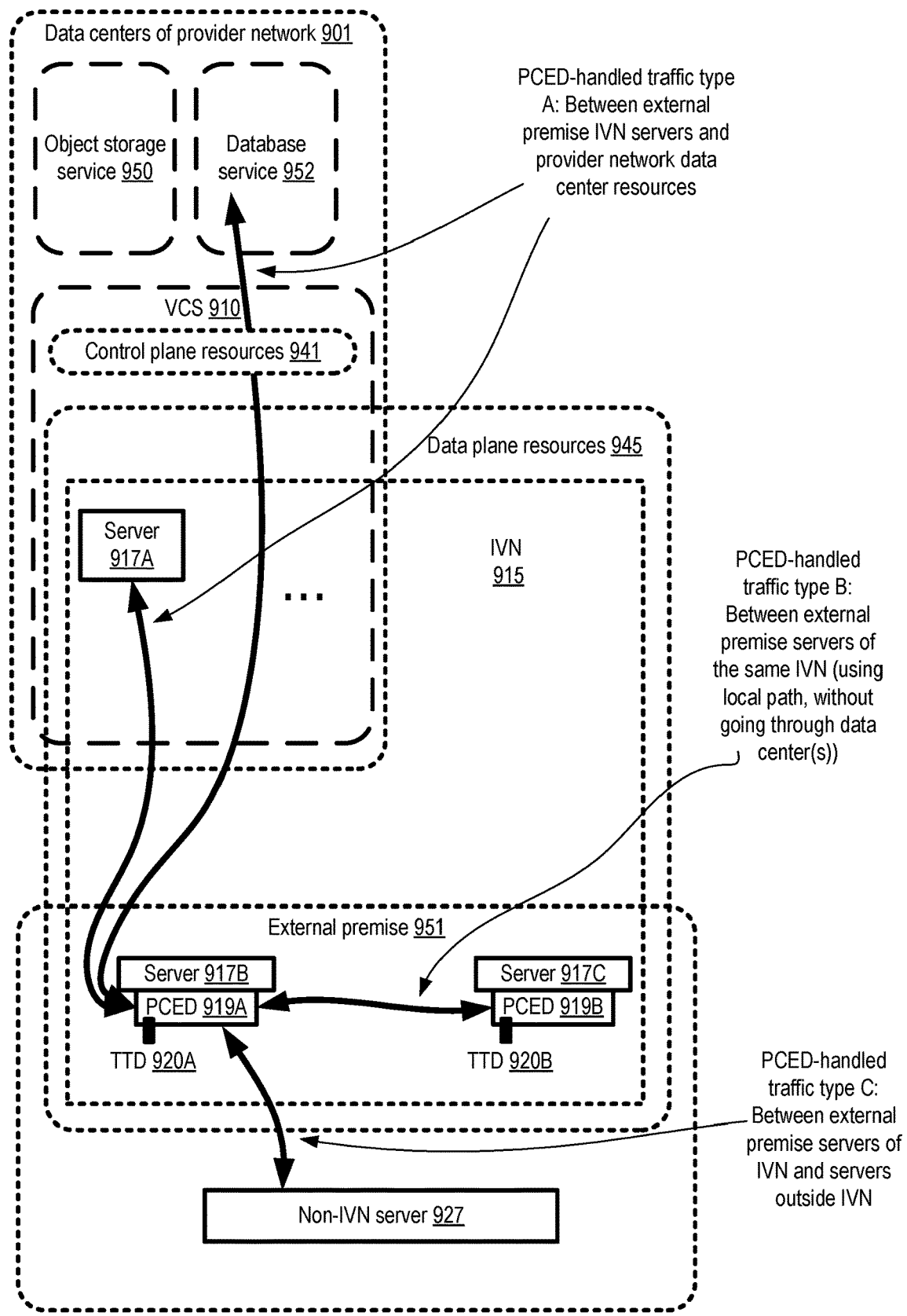
FIG. 9 illustrates example types of network traffic flows which may be managed with the help of a private-network connectivity enablement device, according to at least some embodiments.

After their associated servers have been configured within the VCS, PCEDs with features and functionality similar to that of PCED 132 of FIG. 1 may be used to process network traffic of a number of different source/destination combinations in some embodiments. FIG. 9 illustrates example types of network traffic flows which may be managed with the help of a private-network connectivity enablement device, according to at least some embodiments.

In the example scenario shown in FIG. 9, data centers of a provider network 901 comprise resources of several different network-accessible services, including a VCS 910, an object storage service 950, and a database service 952. Control plane resources 941 of the VCS are located within the data centers 901. Data plane resources 945 of the VCS are distributed among the provider network data centers and an external premise 951. An IVN 915 established at the VCS comprises a server 917A within the provider network data centers, as well as servers 917B and 917C located at premise 951. Server 917B is linked to PCED 919A (which has TTD 920A attached), while server 917C is linked to PCED 919B (which has TTD 920B attached to it). The external premise 951 also includes one or more non-IVN servers 927, which are connected to a local network of the premise 951 but are not configured within the VCS.

In the depicted embodiment, all packets sent from or to a given external premise server (such as 917B or 917C) which is linked to a PCED have to pass through, and be processed at, the PCED. Thus, all packets to/from server 917B are processed at PCED 919A, and all packets to/from server 917C are processed at PCED 919B.

At least three types of traffic or network flows may be processed or handled at a given PCED such as 919A in the depicted embodiment. PCED-handled traffic type A comprises packets flowing between external premise IVN servers and provider network data center resources. For example, packets sent from server 917B to server 917A, or received from server 917A and directed to server 917B, may be processed at PCED 919A. An encapsulation protocol of the VCS may be implemented at PCED 919A for such packets in some embodiments, for example, as part of the packet processing. Similarly, packets sent from server 917A to services 950 or 952, or directed from such services to server 917B, may be processed at PCED 919A.

PCED-handled traffic type B comprises packets flowing between external premise servers of the same IVN, such as IVN 915. Even though both servers 917C and 917B are part of an IVN 915 managed by the VCS control plane resources 941, and traffic between IVN resources typically uses network paths within provider network data centers, data plane traffic between the two servers co-located at the same external premise 951 may instead be caused to flow over a local path at external premise 951 as a performance optimization in the depicted embodiment.

PCED-handled traffic type C comprises packets flowing between external premise servers of an IVN, and non-IVN servers such as servers 927 which are located at the same premise. The PCED 919A may in effect serve as a gateway or router connecting the VCS's internal networks to the client-premise network to which the non-IVN servers 927 are also connected. The appropriate route table entries needed to manage all three types of traffic shown in FIG. 9 by a PCED such as 919A may be generated by the VCS control plane, e.g., in coordination with one or more routers or other networking intermediary devices of the external premise's local network in some embodiments. In some cases, an administrator of the external premise 951 may interact with the VCS to enable the appropriate routing to be implemented at a PCED.

In at least one embodiment, a client on whose behalf servers such as 917B and 917C are added as data plane resources to a VCS 910 may use programmatic interfaces of the VCS (similar to the interfaces 777 of FIG. 7) to submit respective packet processing requirements for various categories of traffic associated with the servers 917. Such packet processing requirements may be transmitted from the VCS control plane resources 841 to the appropriate PCEDs 919 associated with the servers, and the PCEDs 919 may implement the desired types of packet processing. For example, in accordance with client-specified packet processing requirements, packets sent from one external-premise server 917B to another external-premise server 917C configured within the same IVN 915 may be encrypted by the sending server 917B's PCED 919A, transmitted over a local path to the receiving server 917C's PCED 919B, and decrypted at the receiving server 917C's PCED 919B before being provided to the receiving server 917C. As part of the packet processing requirements, clients may indicate the specific encryption protocol to be used in some embodiments. Other packets generated at the server 917B may be sent in un-encrypted form, e.g., to a non-IVN server 927 or some other destination by PCED 919A, also based on the client-specified packet processing requirements. In various embodiments, clients may specify a variety of packet processing requirements for different categories of PCED-equipped servers' traffic (e.g., traffic type A, B or C shown in FIG. 9), and the PCEDs may perform the desired processing. For example, log records indicating transmissions of some packets (e.g., packets of type B or type C traffic) may be generated by the PCEDs, while logging of other packets may be handled by other resources of the VCS.

Use Cases

The techniques described above, of utilizing token-based techniques which require the physical presence of an authorized individual to enable client-selected resources located at premises outside a provider network to be managed as data plane resources of provider network services, may be extremely useful in a variety of scenarios. Many organizations that utilize provider network resources (such as virtual machines of various capability levels) for features such as scalability, availability, reliability, and security may wish to utilize similar features at hardware servers of the their choice—e.g., at hardware servers that are familiar to the IT staff of the organizations, or are optimized for certain types of applications. At the same time, the administrators of the external premises may wish to ensure that a given server is only added to a given provider network service after stringent security precautions are taken, and that the administrators are able to visually check which external premise machines are configured within respective private or isolated networks. The physical hardware device-based security mechanisms described, including the use of the TTDs (whose presence/absence at a server may be easy to detect visually), TMs and PCEDs may help to provide the desired level of security assurances for the administrators. Additionally, in some cases, the TTDs may be color-coded or otherwise labeled if desired so that it becomes easy for an administrator to detect the particular isolated networks to which different external-premise servers are connected. The ability to support, using local equipment at any desired location with Internet connectivity, the same capabilities as those offered at provider network data centers may greatly expand the range of applications that can be run efficiently and securely by provider network clients.

Illustrative Computer System

Figure 10:
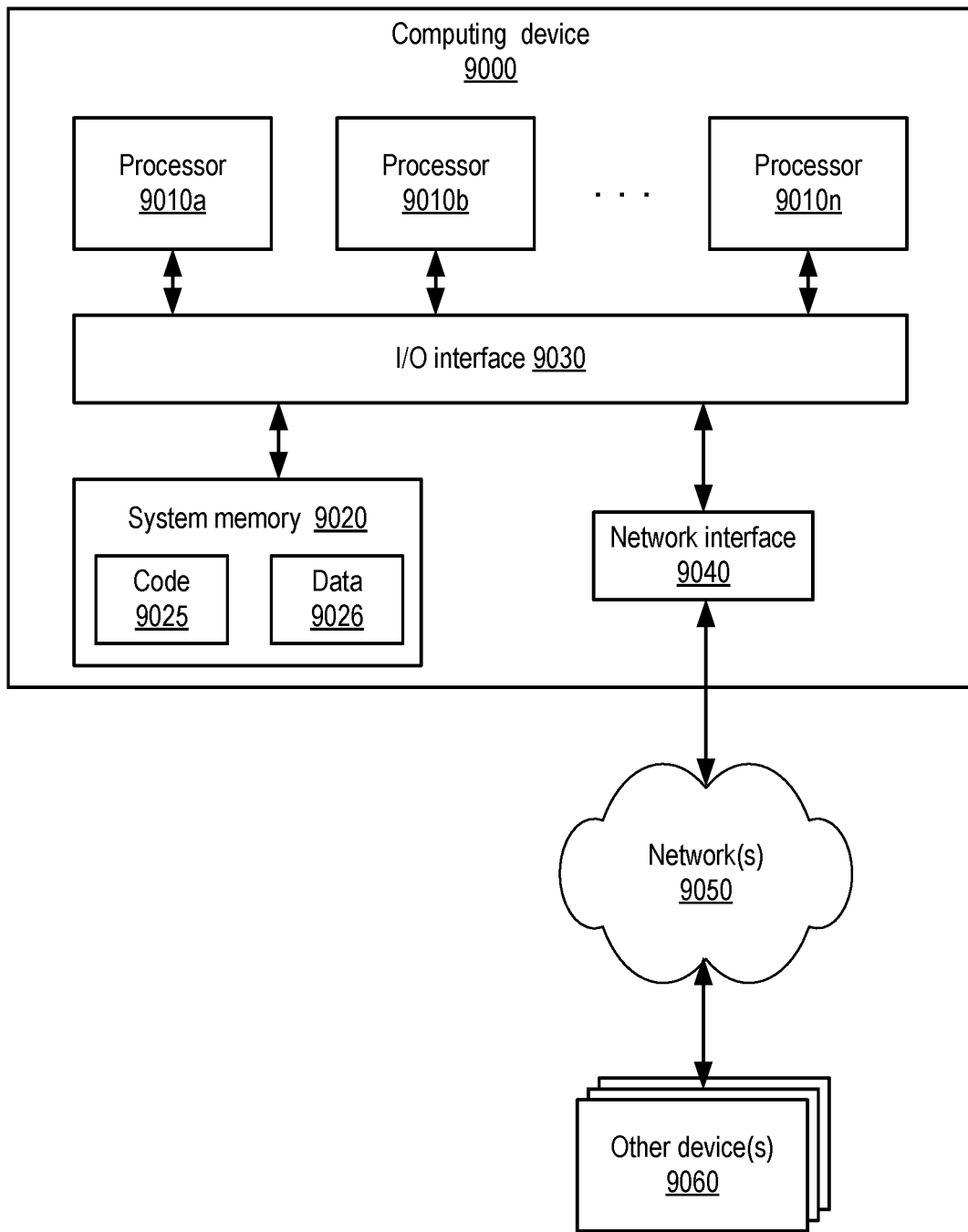
FIG. 10 is a block diagram illustrating an example computing device that may be used in at least some embodiments.

In at least some embodiments, a server that implements one or more of the techniques described herein (e.g., establishing connectivity between the VCS and the devices at the external premise, verifying identities, making configuration changes associated with isolated networks, performing the functions of a token manager, etc.), and or a client-selected server added to a provider network at the request of a client, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
verify, by one or more control plane resources of a virtualized computing service of a provider network, an identity of a token manager located at a premise external to the provider network, wherein the one or more control plane resources are located at one or more data centers of the provider network, and wherein the identity of the token manager is indicated at least in part by a first message received at the control plane resources from the token manager, wherein the first message is signed using a private key embedded in hardware at the token manager;
verify, by the one or more control plane resources, an identity of a private-network connectivity enablement device located at the premise external to the provider network, wherein the identity of the private-network connectivity enablement device is indicated at least in part by a second message received at the control plane resources from the private-network connectivity enablement device, wherein the second message is signed using a private key embedded in hardware at the private-network connectivity enablement device;
identify, at the one or more control plane resources, a target isolated virtual network of the virtualized computing service, wherein a first server located at the premise is to be configured as a data plane resource within one or more isolated virtual networks including the target isolated virtual network;
in response to determining, at the one or more control plane resources based at least in part on one or more additional messages received from the private-network connectivity enablement device, that (a) a security token, generated at the token manager using an artifact associated with the target isolated virtual network, has been obtained at the private-network connectivity enablement device from a re-writable hardware device inserted into a port of the private-network connectivity enablement device, and (b) that at least one network path exists between the first server and the private-network connectivity enablement device, store metadata indicating that the first server has been configured as a data plane resource of the target isolated virtual network; and in response to a programmatic request received at the one or more control plane resources via a network path which does not include the private-network connectivity enablement device, modify a network configuration setting of the first server.

2. The system as recited in claim 1, wherein the one or more computing devices include further instructions that upon execution on or across the one or more processors further cause the one or more computing devices to:

verify, prior to storing the metadata, that one or more log records have been written to persistent storage, wherein the one or more log records indicate that the token manager and the private-network connectivity enablement device were used to cause the first server to be configured as a data plane resource.

3. The system as recited in claim 1, wherein the metadata indicating that the first server has been configured includes a record of an assignment of a private address of the target isolated virtual network to the first server.

4. The system as recited in claim 1, wherein the one or more computing devices include further instructions that upon execution on or across the one or more processors further cause the one or more computing devices to:

transmit, from the one or more control plane resources to the private-network connectivity enablement device the after the first server has been configured, an indication that a local network path is to be used to transfer packets between the first server and a second server located at the premise external to the provider network, wherein the second server is configured as a data plane resource of the target isolated virtual network.

5. The system as recited in claim 1, wherein the one or more computing devices include further instructions that upon execution on or across the one or more processors further cause the one or more computing devices to:

transmit, from the one or more control plane resources to the token manager, the artifact associated with the target isolated virtual network.

6. A method, comprising:

performing, at one or more computing devices:

establishing connectivity between a control plane of a virtualized computing service of a provider network and a token manager located at a premise external to the provider network;

establishing connectivity between the control plane of the virtualized computing service and a private-network connectivity enablement device located at the premise external to the provider network; and in response to determining, at the control plane of the virtualized computing service, that a security token generated at the token manager using an artifact associated with a target isolated virtual network has been transferred to the private-network connectivity enablement device, initiating one or more operations to configure a target server, connected to the private-network connectivity enablement device, as a data plane resource within the target isolated virtual network.

7. The method as recited in claim 6, further comprising performing, at the one or more computing devices:

obtaining, at the control plane prior to initiating the one or more operations, one or more messages transmitted from the private-network connectivity enablement device, wherein the one or more messages indicate that the identity of a hardware device containing the security token has been verified at the private-network connectivity enablement device, wherein the security token is obtained at the private-network connectivity enablement device after the hardware device is inserted into the private-network connectivity enablement device.

8. The method as recited in claim 6, further comprising performing, at the one or more computing devices:

obtaining, at the control plane prior to initiating the one or more operations, one or more messages transmitted from the private-network connectivity enablement device, wherein the one or more messages indicate that the private-network connectivity enablement device has determined that a validity period of the security token has not expired.

9. The method as recited in claim 6, further comprising performing, at the one or more computing devices:

obtaining, at the private-network connectivity enablement device, the token from a hardware device inserted into the private-network connectivity enablement device;

after the target server has been configured within the target isolated virtual network, periodically transmitting, by the private-network connectivity enablement device to the hardware device, a request to re-submit an indication of the identity of the hardware device; and in response to detecting, by the private-network connectivity enablement device, one or more of: (a) that the identity indication of the hardware device is invalid, or (b) that the hardware device has been disconnected from the private-network connectivity enablement device, causing the target server to be disassociated from the target isolated virtual network.

10. The method as recited in claim 6, further comprising performing, at the one or more computing devices:

transmitting, from the control plane to the private-network connectivity enablement device, an indication of another data plane resource of the target isolated virtual network, wherein the other data plane resource is located at the premise external to the provider network; and encrypting, by the private-network connectivity enablement device, a packet generated at the target server;

transmitting, by the private-work connectivity enablement device, an encrypted version of the packet to the other data plane resource via a local-premise network pathway which does not include a device located at a data center of the provider network.

11. The method as recited in claim 6, further comprising performing, at the one or more computing devices:

obtaining an indication, at the private-network connectivity enablement device, of one or more packet processing requirements for outbound network packets from the target server;

transmitting, by the private-network connectivity enablement device in accordance with the one or more packet processing requirements, (a) an encrypted version of a first packet generated at the target server to a first destination and (b) an unencrypted version of a second packet generated at the target server to a second destination.

12. The method as recited in claim 6, further comprising performing, at the one or more computing devices:
causing, by the private-network connectivity enablement device, a packet generated at the target server to be transmitted to a resource which is not configured within the target isolated network.

13. The method as recited in claim 6, further comprising performing, at the one or more computing devices:
obtaining, at the control plane, one or more messages from the token manager indicating that prior to generating the token, the token manager obtained an indication that a token requester at whose request the token is generated at the premise is permitted to obtain tokens associated with the isolated virtual network.

14. The method as recited in claim 6, further comprising performing, at the one or more computing devices:
causing a record of an association of the token with the connectivity enablement device to be stored, such that the token cannot be employed to configure a different server connected to a different connectivity enablement device; and
verifying, at the control plane, using the record, that the token is associated with the connectivity enablement device prior to initiating the one or more operations.

15. The method as recited in claim 6, further comprising performing, at the one or more computing devices:
causing, prior to a generation of the token by the token manager, a record of a verification of the identity of the token transfer device by the token manager to be stored.

16. A connectivity enablement device, comprising:
one or more processors;
one or more memories; and
a hardware input port;
wherein the one or more memories include program instructions that upon execution on or across the one or more processors:
examine a token obtained from a token transfer device inserted into the hardware input port;
cause one or more network messages to be transferred to a virtualized computing service, comprising respective indications of (a) the connectivity enablement device, (b) the token transfer device, (c) a source at which the token was generated and (d) a server linked to the connectivity enablement device, wherein the server is to be configured within an isolated virtual network of the virtualized computing service; and
obtain, from the virtualized computing service, an indication that the server has been configured within the isolated virtual network.

17. The connectivity enablement device as recited in claim 16, wherein the one or more memories include further program instructions that upon execution on or across the one or more processors:
verify, prior to causing the one or more network messages to be transferred, the identity of the token transfer device.

18. The connectivity enablement device as recited in claim 16, wherein the one or more memories include further program instructions that upon execution on or across the one or more processors:
verify, prior to causing the one or more network messages to be transferred, that a validity period of the token has not expired.

19. The connectivity enablement device as recited in claim 16, wherein the one or more memories include further program instructions that upon execution on or across the one or more processors:
send, to the token transfer device, an indication of the identity of the connectivity enablement device.

20. The connectivity enablement device as recited in claim 16, wherein the one or more memories include further program instructions that upon execution on or across the one or more processors further:
cause, in response to detecting a condition, the server to be removed from the isolated virtual network.

* * * * *